(12) United States Patent
Yamada et al.

(10) Patent No.: US 10,859,524 B2
(45) Date of Patent: Dec. 8, 2020

(54) HUMIDITY SENSING ELEMENT AND HYGROMETER

(71) Applicant: Hitachi, Ltd., Tokyo (JP)

(72) Inventors: Masuyoshi Yamada, Tokyo (JP); Hironori Wakana, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 133 days.

(21) Appl. No.: 15/949,800

(22) Filed: Apr. 10, 2018

(65) Prior Publication Data

US 2018/0299397 A1 Oct. 18, 2018

(30) Foreign Application Priority Data

Apr. 13, 2017 (JP) .................... 2017-079747

(51) Int. Cl.
*G01N 27/22* (2006.01)
(52) U.S. Cl.
CPC .................. *G01N 27/225* (2013.01)
(58) Field of Classification Search
CPC ..... G01N 27/22; G01N 27/223; G01N 27/225
See application file for complete search history.

(56) References Cited

U.S. PATENT DOCUMENTS

| | | | | |
|---|---|---|---|---|
| 4,523,142 A | * | 6/1985 | Murata | G01N 27/122 324/689 |
| 4,695,787 A | * | 9/1987 | Billet | G01V 1/201 324/557 |
| 5,801,307 A | * | 9/1998 | Netzer | B32B 17/10036 73/170.17 |
| 6,114,862 A | * | 9/2000 | Tartagni | G01B 7/004 324/661 |
| 7,471,093 B2 | * | 12/2008 | Arisaka | G01N 27/225 324/664 |
| 9,027,400 B2 | * | 5/2015 | Le Neel | G01N 27/223 73/335.04 |

FOREIGN PATENT DOCUMENTS

| | | | | |
|---|---|---|---|---|
| GB | 2022837 A | * | 12/1979 | .......... G01N 27/121 |
| JP | 59-116535 A | | 7/1984 | |
| JP | 60-211346 | | 10/1995 | |
| JP | 2005-069718 A | | 3/2005 | |
| JP | 2015097546 A | * | 5/2015 | .......... A61B 5/0537 |

* cited by examiner

*Primary Examiner* — Walter L Lindsay, Jr.
*Assistant Examiner* — Milton Gonzalez
(74) *Attorney, Agent, or Firm* — Procopio, Cory, Hargreaves & Savitch LLP

(57) ABSTRACT

Disclosed is a humidity sensing element that includes an insulation section made of an insulating material, an application electrode to which a voltage is applied, and an output electrode which outputs a voltage signal corresponding to an electrical current flowing through an electrical path via water molecules adhering to a surface of the insulating material in response to the voltage applied to the application electrode. A distance between the application electrode and the output electrode is equal to or greater than a predetermined value, and/or a total sum of lengths of portions where the application electrode and the output electrode face each other is less than a predetermined value.

9 Claims, 16 Drawing Sheets

TIME [SECOND]

TIME [SECOND]

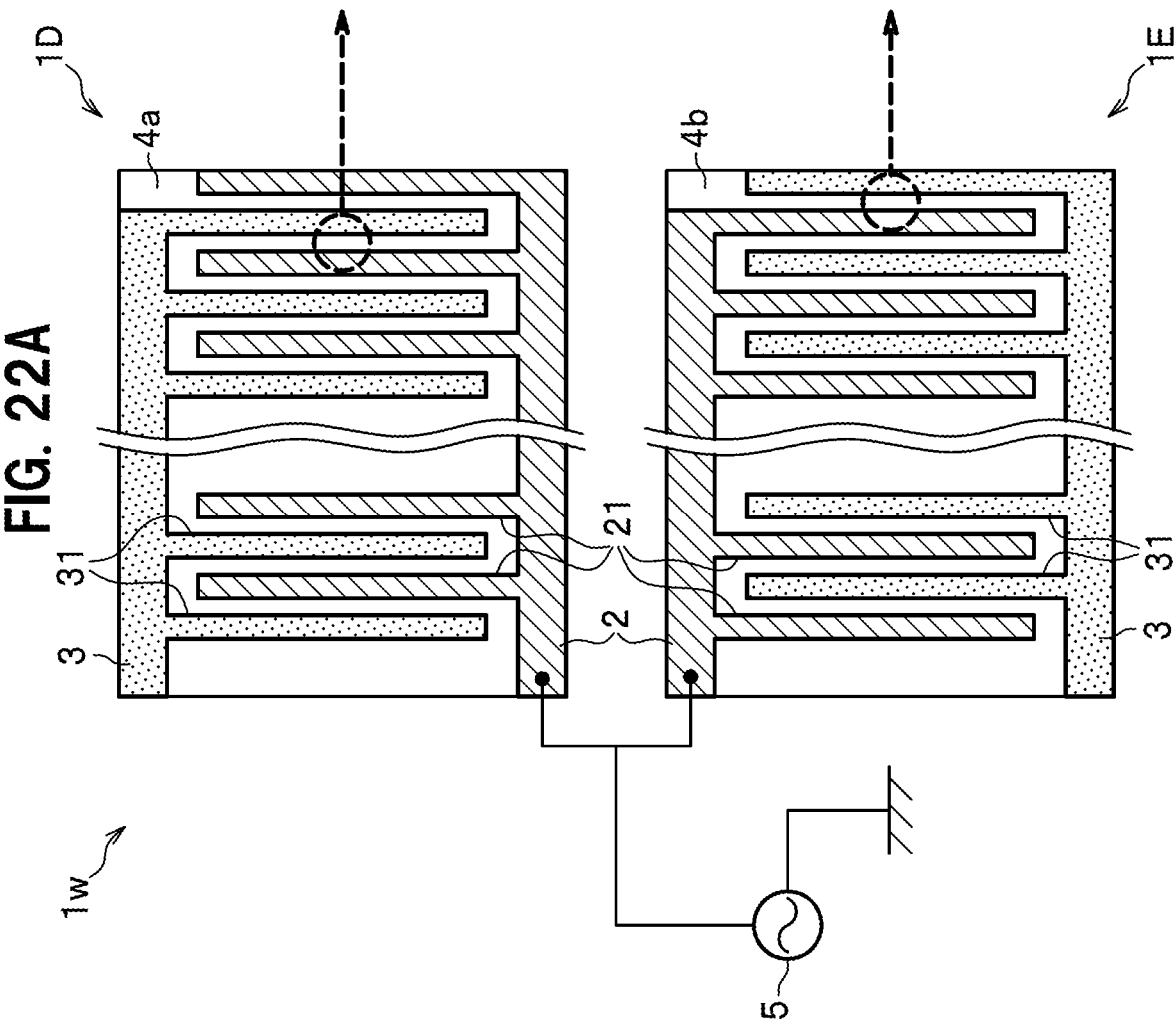
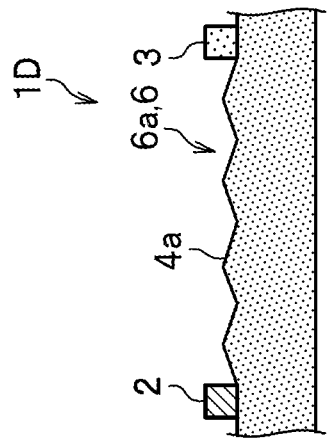
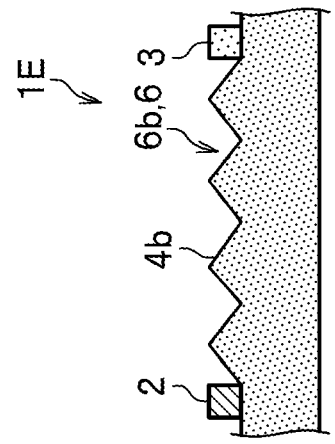

HUMIDITY SENSING ELEMENT AND HYGROMETER

BACKGROUND OF THE INVENTION

1. Field of the Invention

The present invention relates to a technique for a humidity sensing element and a hygrometer that measure humidity.

2. Description of the Related Art

Patent Literature 1, Patent Literature 2 and Patent Literature 3 have disclosed a humidity sensing element (humidity sensor) and condensation sensors.

Patent Literature 1 has disclosed a humidity sensor in which "a poisoning prevention layer 60 is formed in the shape of a layer from a metal oxide for a poisoning prevention layer such that the poisoning prevention layer 60 covers a protective layer 50 and a lower portion of an electrically-insulating substrate 10, wherein the porosity of the poisoning prevention layer 60 is set at a value within a range of 20(%) to 35(%)," and a method of manufacturing the humidity sensor (see Abstract).

Patent Literature 2 has disclosed a condensation sensor which "includes: counter electrodes formed on a substrate; and an organic polymer coating film under which the counter electrodes and the area between the counter electrodes are covered with an insulating porous metal oxide, wherein the organic polymer coating film contains 10 ppm to 100 ppm of a phthalocyanine-based pigment" (see claims).

Patent Literature 3 has disclosed a condensation sensor which "includes: a substrate; counter electrodes formed on the substrate; a moisture sensitive section covering the counter electrodes and the area between the counter electrodes, and made of an insulating porous oxide whose porosity is 20% to 60%; and an organic polymer coating formed to cover the moisture sensitive section, wherein the main component of the organic polymer coating is a polymer containing a carboxyl group" (see claims).

PRIOR ART DOCUMENTS

Patent Literature 1: JP 2005-069718 A
Patent Literature 2: JP S59-116535 A
Patent Literature 3: JP S60-211346 A

SUMMARY OF THE INVENTION

The technique disclosed in Patent Literature 1, however, makes the structure of the humidity sensor complicated and thick. Thus, the technique imposes a limit to reduction in the size of humidity sensor.

The techniques disclosed in Patent Literature 2 and Patent Literature 3 are capable of determining whether there is condensation using a simple structure, but need to be further modified in order to measure humidity, and achieve higher sensitivity.

The present invention has been made with the above background taken into consideration, and has an object to realize a humidity sensing element with a simpler structure.

To solve the above problem, an aspect of the present invention includes an insulation section made of an insulating material; an application section to which a voltage is applied; and an output section which outputs a voltage signal corresponding to an electrical current flowing through an electrical path via water molecules adhering to a surface of the insulating material in response to the voltage applied to the application section, in which a distance between an application electrode as an electrode forming the application section and an output electrode as an electrode forming the output section is set at a value with which an amount of change in capacitance produced between the application electrode and the output electrode with respect to humidity is equal to or greater than a predetermined value.

Another aspect of the present invention includes an insulation section made of an insulating material; an application section to which a voltage is applied; and an output section which outputs a voltage signal corresponding to an electrical current flowing through an electrical path via water molecules adhering to a surface of the insulating material in response to the voltage applied to the application section, in which a total sum of lengths of portions where an application electrode as an electrode forming the application section and an output electrode as an electrode forming the output section face each other is set at a value with which an amount of change in capacitance produced between the application electrode and the output electrode with respect to humidity is equal to or greater than a predetermined value.

Other solutions will be appropriately discussed in embodiments.

According to the present invention, a humidity sensing element with a simpler structure can be realized.

BRIEF DESCRIPTION OF THE DRAWINGS

FIG. 22A shows the upper surface of the humidity sensing element 1w;

FIG. 22B is a schematic diagram showing a principle of how the humidity sensing element 1w of low-temperature type works;

FIG. 22C is a schematic diagram showing a principle of how the humidity sensing element 1w of high-temperature type works;

DETAILED DESCRIPTION OF THE EMBODIMENTS

Modes (hereinafter referred to as "embodiments") to carry out the present invention will be hereinafter described in detail by referring the accompanying drawings whenever deemed necessary. Incidentally, the same components are denoted by the same reference signs throughout the drawings, and descriptions for such components will be omitted.

First Embodiment (Configuration of Humidity Sensing Element 1)

Figure 1:
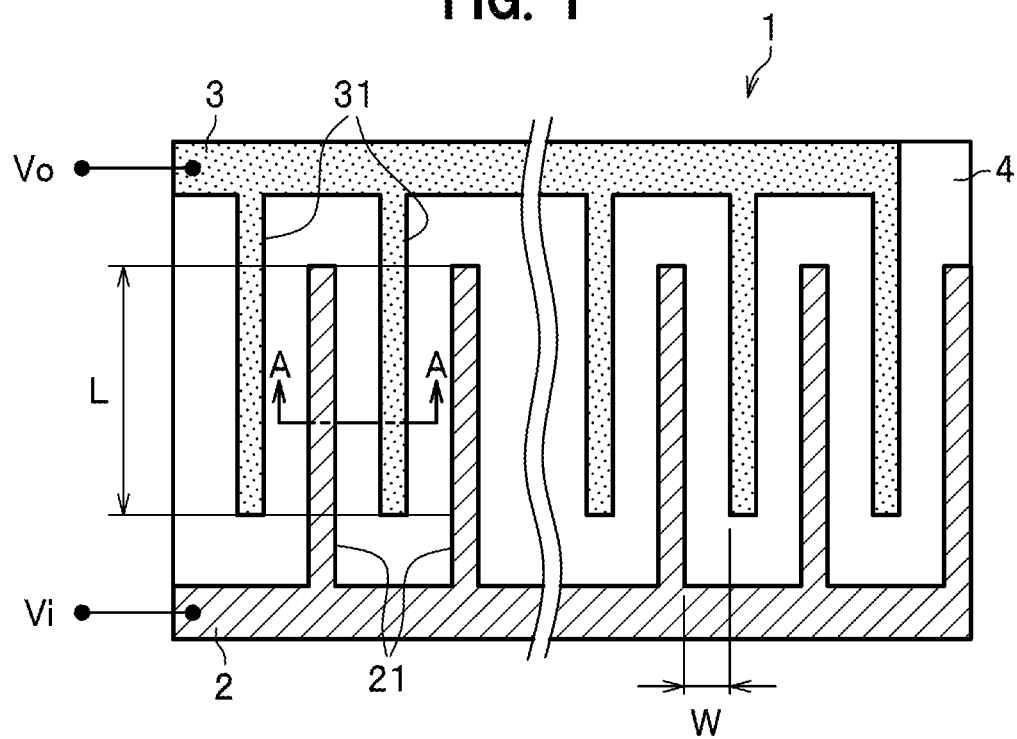
FIG. 1 is a schematic diagram of the upper surface of a humidity sensing element 1 according to a first embodiment.
Figure 2:
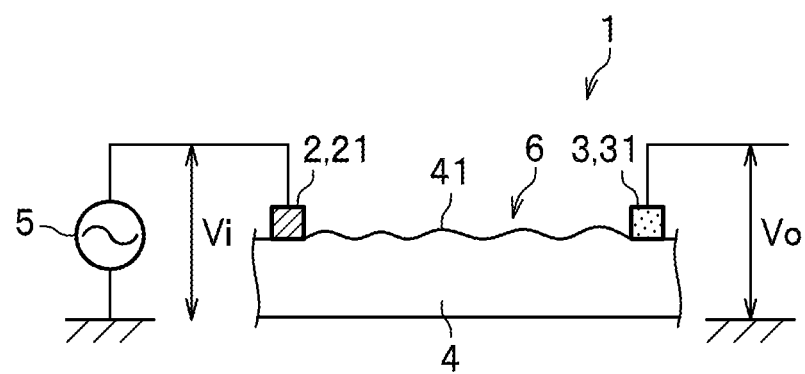
FIG. 2 is a schematic diagram of a cross section of the humidity sensing element 1.

FIG. 1 is a schematic diagram of the upper surface of the humidity sensing element 1 according to a first embodiment. FIG. 2 is a schematic diagram of a cross section of the humidity sensing element 1 taken along the A-A line in FIG. 1.

As shown in FIGS. 1 and 2, the humidity sensing element (humidity sensor) 1 is connected to an AC power supply 5, and includes: an application electrode (application section) 2; an output electrode (output section) 3; and an insulation section 4.

The application electrode 2 is an electrode to which the AC power supply 5 applies an input voltage Vi.

The output electrode 3 is an electrode which detects an output voltage Vo when the humidity sensing element 1 detects moisture.

The insulation section 4 is formed of a substrate made of a hydrophilic insulating material. Specifically, at least a surface 41 of the insulation section 4 is made of an oxide like an insulating metal oxide. In other words, oxygen atoms are arranged at least on the surface 41 of the insulation section 4. This configuration allows more water molecules 11 (see FIG. 4) to adhere to the surface 41. This makes it possible to increase the output voltage Vo, and accordingly to make the humidity sensing element 1 more sensitive.

Incidentally, the insulation section 4 does not necessarily have to be plate-shaped.

As shown in FIG. 2, the insulation section 4 exists between the output electrode 3 (31) and the application electrode 2 (21). In this respect, the surface 41 of the insulation section 4 has an uneven structure (uneven portion 6). Since the surface 41 of the insulation section 4 has the uneven portion 6 like this, the surface 41 of the insulation section 4 can have a larger surface area. In other words, since the surface 41 of the insulation section 4 has the uneven portion 6, the surface 41 allows more water molecules 11 (see FIG. 4) to adhere to the surface 41. This makes it possible to increase the output voltage Vo, and accordingly to make the humidity sensing element 1 more sensitive.

It should be noted that, as shown in FIG. 1, the application electrode 2 and the output electrode 3 are comb-shaped including teeth 21 and teeth 31, respectively. Furthermore, the application electrode 2 and the output electrode 3 are arranged on the insulation section 4 with a space in between in a way that makes the teeth 21 and the teeth 31 face and mesh with each other. This makes it possible to make the area of a moisture attachment section (reaction section) larger than otherwise.

Here, the width of an area where the tooth 21 of the application electrode 2 and the neighboring tooth 31 of the output electrode 3 face each other is referred to as an inter-electrode width W, and W≥20 μm holds. This is named Condition A1. When the inter-electrode width W<20 μm, the electrodes 2, 3 are more easily affected by dirt, for example, because attached dust or the like allows an electrical current to flow between the electrodes 2, 3 even if no moisture is on the insulation section 4.

Furthermore, the length of the area where the tooth 21 of the application electrode 2 and the neighboring tooth 31 of the output electrode 3 face each other (the length of an overlap between the neighboring teeth 21 and 31) is denoted by reference sign L, and the total electrode length L1 is defined as L1=L×the number of teeth 21, 31. Here, the total electrode length L1<90 mm holds. This is called Condition A2, whose details will be discussed later.

The humidity sensing element 1 satisfies Condition A1 and/or Condition A2.

(Principle of Moisture Detection)

Figure 3:
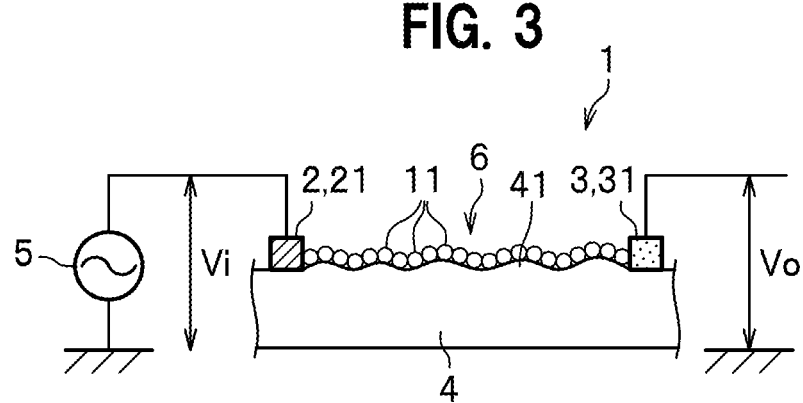
FIG. 3 is a schematic diagram showing a principle of how the humidity sensing element 1 works after moisture adheres to the humidity sensing element 1.
Figure 4:
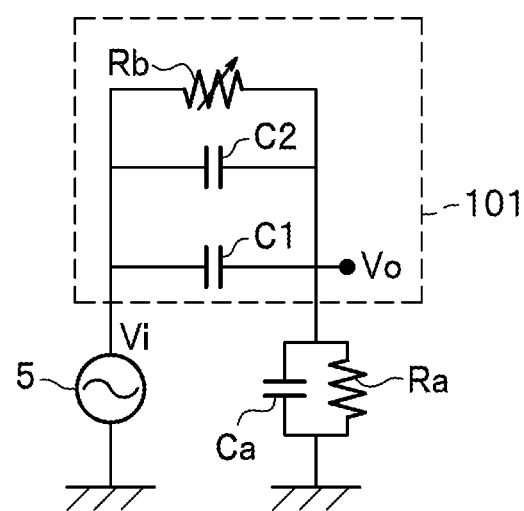
FIG. 4 is a diagram showing an equivalent circuit of the humidity sensing element 1 according to the first embodiment.
Figure 5:
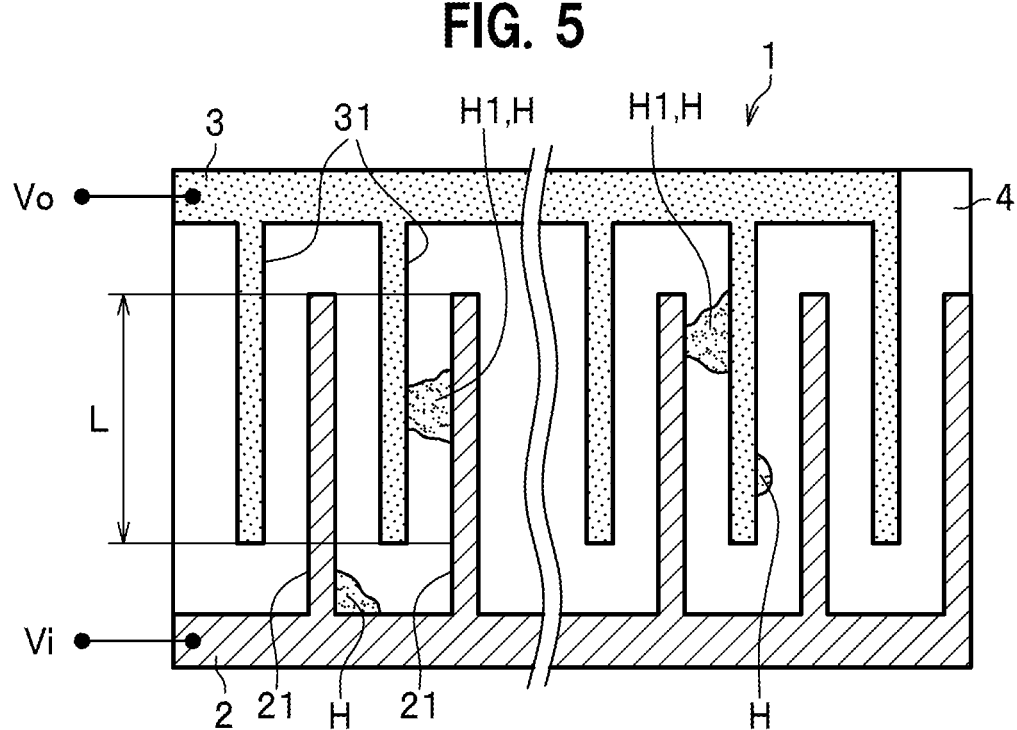
FIG. 5 is a schematic diagram from above of the humidity sensing element 1 with moisture thereon.

FIG. 3 is a schematic diagram showing a principle of how the humidity sensing element 1 works after moisture adheres to the humidity sensing element 1. FIG. 4 is a diagram showing an equivalent circuit of the humidity sensing element 1 according to the first embodiment. FIG. 5 is a schematic diagram from above of the humidity sensing element 1 with moisture thereon.

The components shown in FIG. 3 are the same as those shown in FIG. 2, and are denoted by the same reference signs, and descriptions thereof will be omitted. In addition, the components shown in FIG. 5 are the same as those shown in FIG. 1, and are denoted by the same reference signs, as well as descriptions for the components will be omitted.

As shown in FIG. 2, before moisture adheres to the insulation section 4, no electrical current flows between the output electrode 3 and the application electrode 2 since the tooth 21 of the application electrode 2 and the tooth 31 of the output electrode 3 are connected by the insulation section 4. Thus, no voltage is detected from the output electrode 3 although the alternating current (AC) voltage is applied to the application electrode 2.

When moisture adheres to the insulation section 4 of the humidity sensing element 1, the water molecules 11 adhere to the insulation section 4, as shown in FIG. 3. Thus, the water molecules 11 serve as a path to allow an electrical current to flow between the output electrode 3 and the application electrode 2, and the voltage applied to the application electrode 2 is detected (outputted) from the output electrode 3. Based on the detected (outputted) voltage, the humidity sensing element 1 detects the moisture.

In general, nevertheless, electrical conduction between the output electrode 3 and the application electrode 2 through moisture H (water molecules 11) is not uniform as shown in FIG. 5. Specifically, an electrical current flows between parts of the respective facing teeth 21, 31 due to the moisture H1 (water molecules 11) whereas no electrical current flows between the other parts of the respective facing teeth 21, 31, since the application electrode 2 and the output electrode 3 are away from each other by the inter-electrode width W, as discussed above.

What has been discussed above will be elaborated on by referring to FIG. 4. In FIG. 4, a resistance Rb and a capacitance C2 represent parts of the humidity sensing element 1 between which electrical current flows due to the adhering water molecules 11. The capacitance C2 remains because full electrical conduction is not established even between the parts of the humidity sensing element 1 between which electrical current flows due to the water molecules 11. As more water molecules 11 adhere to humidity sensing element 1, the resistance Rb becomes smaller while the capacitance C2 becomes larger.

It should be noted that when no water molecules 11 adhere to the humidity sensing element 1, Rb=∞ and C2=0. In other words, the resistance Rb and the capacitance C2 are in an open state.

Meanwhile, in FIG. 4, a capacitance C1 represents the parts of the humidity sensing element 1 to which no water molecules 11 adhere.

As more water molecules 11 adhere to humidity sensing element 1, the capacitance C1 becomes larger.

In this contrast to this, the input voltage Vi is constant. In addition, the circuit including the resistance Ra and a capacitance Ca represents an internal resistance of the humidity sensing element 1.

In this respect, a combined impedance Z of a part 101 of the equivalent circuit in FIG. 4 is expressed with $$Z=1/((1/Rb)+j\omega(C1+C2))$$ Equation (1).

As this combined impedance Z becomes smaller, the output voltage Vo becomes larger, that is, the sensitivity becomes higher.

Figure 6:
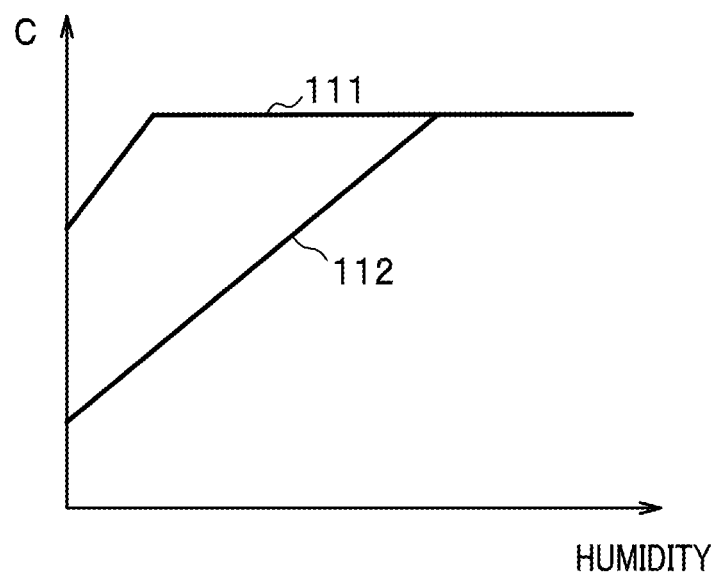
FIG. 6 is a graph showing a relationship between humidity and a combined capacitance C.

FIG. 6 is a graph showing a relationship between the humidity and a combined capacitance C.

In FIG. 6, the vertical axis represents the combined capacitance C, and the horizontal axis represents the humidity. In this respect, the combined capacitance C is a capacitance obtained by combining the capacitances C1, C2 in FIG. 4.

A graph 111 represents a characteristic of the humidity vs. the combined capacitance C which is observed in a case where the total electrode length L1 is long and the inter-electrode width W is narrow. In other words, the graph 111 shows the characteristic of the humidity vs. the combined capacitance C in the humidity sensing element 1 which does not satisfy Condition A1 or Condition A2, which are discussed above.

In contrast, a graph 112 represents the characteristic of the humidity vs. the combined capacitance C which is observed in a case where the total electrode length L1 is short and the inter-electrode width W is wide. In other words, the graph 112 shows the characteristic of the humidity vs. the combined capacitance C in the humidity sensing element 1 which satisfies Condition A1 and Condition A2, which are discussed above.

The graph 112 shows that the combined capacitance C becomes saturated only after the humidity becomes relatively high, whereas the graph 111 shows that the combined capacitance C becomes saturated at relatively low humidity. In the humidity sensing element 1 used for the graph 112, the total electrode length L1 is short and the inter-electrode width W is wide. Therefore, the combined capacitance C remains unsaturated until more water molecules 11 adhere to the humidity sensing element 1 than to the element used for the graph 111.

Until the combined capacitance C becomes saturated, that is, while the combined capacitance C is changing, the impedance expressed with Equation (1) is changing as well. In other words, a region where the combined capacitance C is changing is a range where an amount of change in the combined capacitance C (capacitance produced between the application electrode 2 and the output electrode 3) with respect to the humidity is equal to or greater than a predetermined value, that is, the output voltage Vo changes. Accordingly, the time period when the combined capacitance C is changing defines a range where a change in the humidity can be outputted as a change in the output voltage Vo. When the range where the combined capacitance C is changing is sufficiently wide, the change in the humidity is easier to detect.

The dynamic range of the output voltage Vo in the humidity sensing element 1 can be made wider by shortening the total electrode length L1 and widening the inter-electrode width W, as discussed above. Incidentally, a result similar to that shown in FIG. 6 can be obtained from the humidity sensing element 1 where only the total electrode length L1 is shortened, and from the humidity sensing element 1 where only the inter-electrode width W is widened.

Figure 7:
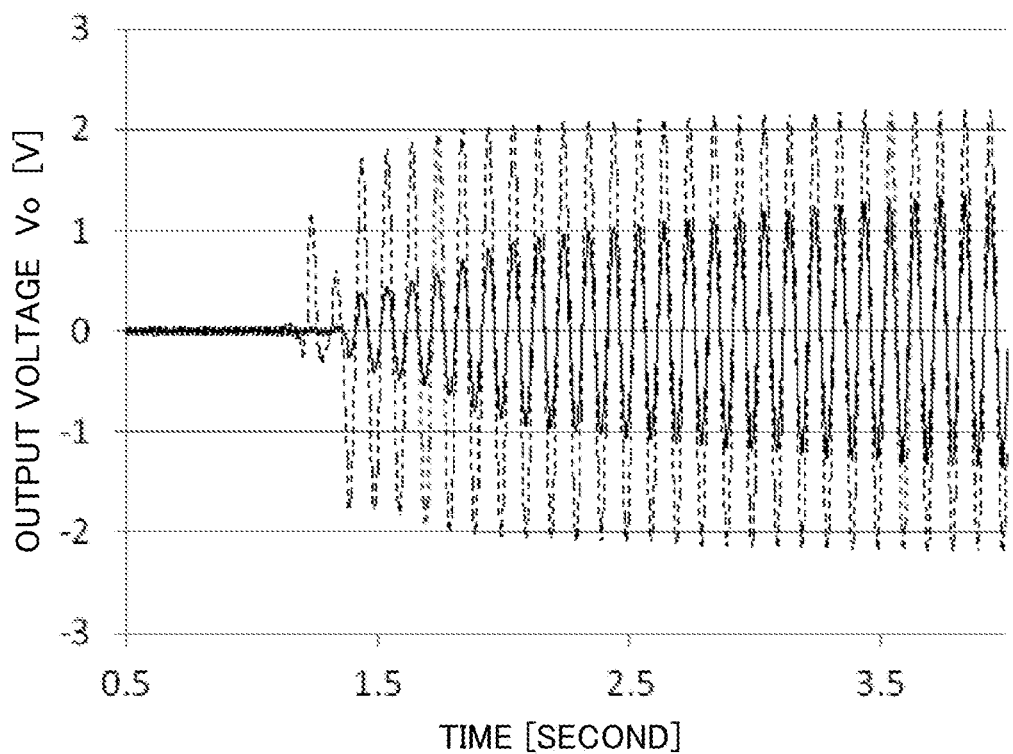
FIG. 7 is a diagram showing an output voltage Vo which is outputted from the humidity sensing element 1 at high humidity.
Figure 8:
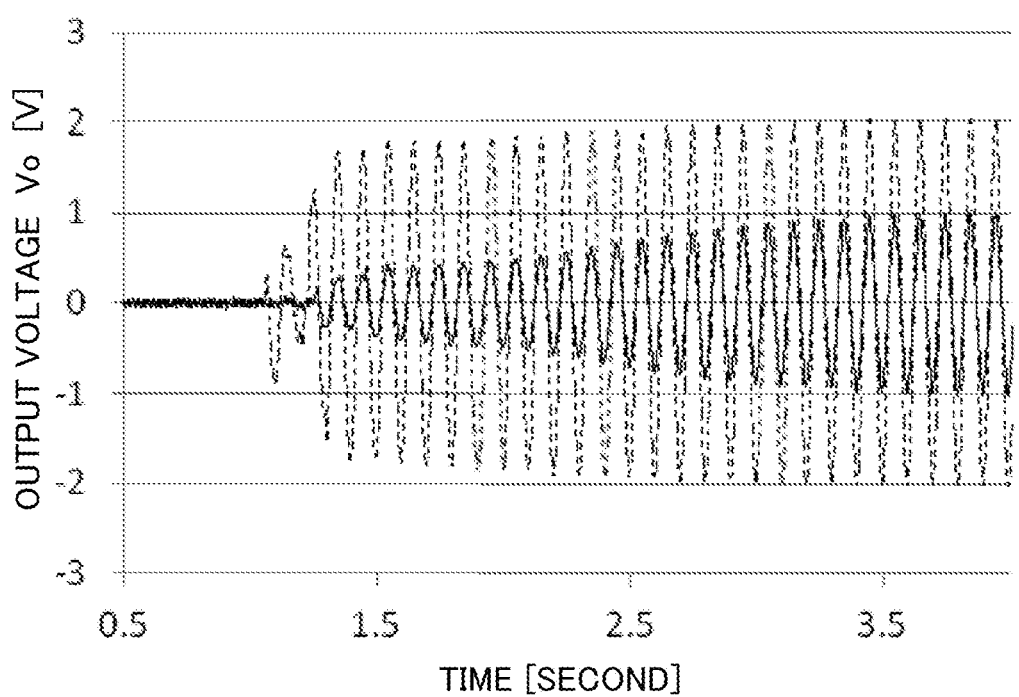
FIG. 8 is a diagram showing the output voltage Vo which is outputted from the humidity sensing element 1 at low humidity.

FIG. 7 is a diagram showing the output voltage Vo which is outputted from the humidity sensing element 1 at high humidity. FIG. 8 is a diagram showing the output voltage Vo which is outputted from the humidity sensing element 1 at low humidity.

In FIGS. 7 and 8, the vertical axis represents the output voltage Vo (V), the horizontal axis represents time (second).

Furthermore, in FIGS. 7 and 8, a broken line represents a result which was obtained when the total electrode length L1 was 90 mm, and a solid line represents a result which was obtained when the total electrode length L1 was 9 mm. The frequency of the AC voltage applied to the application electrode 2 was 10 Hz. Incidentally, when the results represented by the solid and broken lines in FIGS. 7 and 8 were obtained, the inter-electrode width W was 20 μm. In other words, the broken line represents the result obtained using the humidity sensing element which did not satisfy Condition A2.

As clear from FIGS. 7 and 8, when L1 (total electrode length)=90 mm (broken line), no obvious difference was observed between the result at high humidity and the result at low humidity. In contrast to this, when L1 (total electrode length)=9 mm (solid line), a difference was observed between the output voltage Vo at high humidity and the output voltage Vo at low humidity. Specifically, when L1 (total electrode length)=9 mm (solid line), the output voltage Vo was higher at high humidity than at low humidity.

FIGS. 7 and 8 show that the total electrode length L1 of less than 90 mm made the difference in the output voltage Vo due to the humidity clear.

It should be noted that although FIGS. 7 and 8 show how the output voltage Vo differed depending on the difference in the total electrode length L1, similar results can be obtained even when the inter-electrode width W is changed. Specifically, when the inter-electrode width W is widened, results similar to those represented by the solid lines in FIGS. 7 and 8 can be obtained. When the inter-electrode width W is narrowed, results similar to those represented by the broken lines in FIGS. 7 and 8 can be obtained.

As discussed above, the humidity sensing element 1 which satisfies Condition A1 and/or Condition A2 is capable of achieving a wider dynamic range of the humidity measurement, and accordingly measuring the difference in the humidity more precisely.

Second Embodiment

Referring to FIGS. 9 to 15, descriptions will be hereinbelow provided for a second embodiment of the present invention. The second embodiment is characterized in that an input voltage Vi with a rectangular wave is applied to a humidity sensing element 1 having the configuration of the first embodiment.

The humidity sensing element 1 of the first embodiment makes the capacitances C1, C2, depicted in FIG. 4, and their combined capacitance C small, since the inter-electrode width W is large (for example, 20 μm or greater), and the total electrode length L1 is short (for example, less than 90 mm). As learned from the foregoing Equation (1), a smaller angular frequency ω of the input voltage Vi, that is, a smaller frequency f, makes the combined impedance Z larger, and thus decreases the detection sensitivity of the humidity sensing element 1. For the purpose of solving this problem, the second embodiment applies an input voltage Vi inclusive of a high frequency to the humidity sensing element 1.

Figure 9:
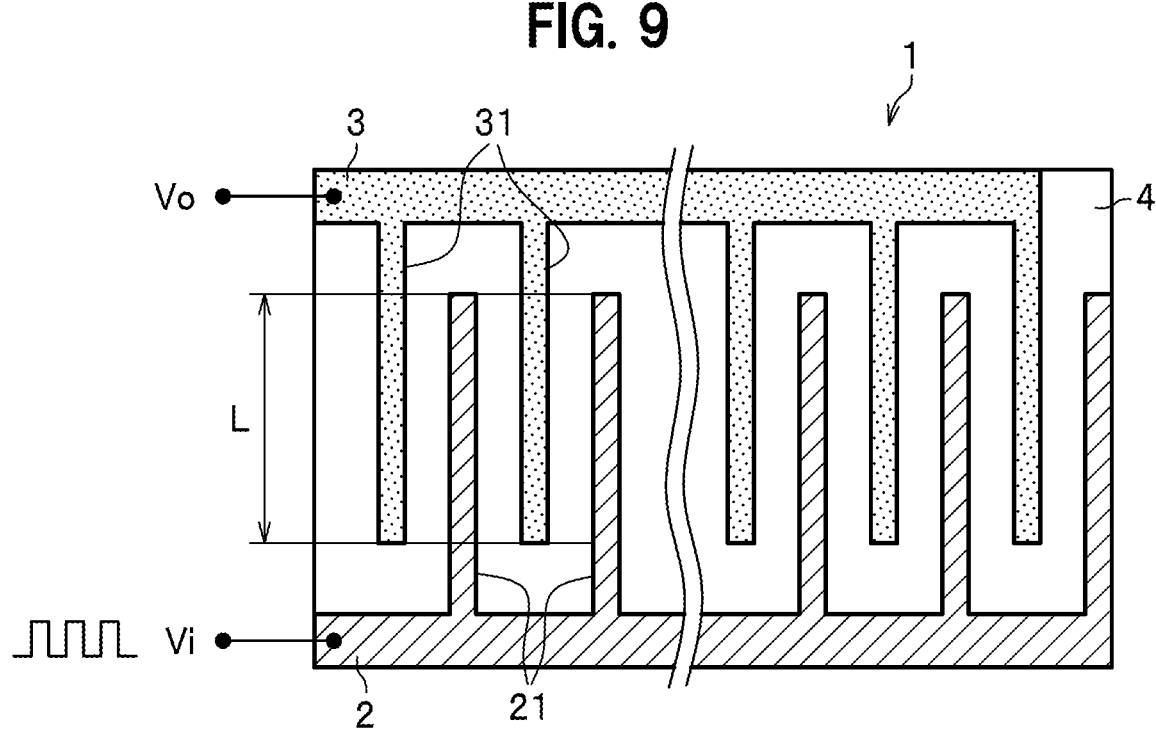
FIG. 9 is a schematic diagram of the upper surface of a humidity sensing element 1 according to a second embodiment.

FIG. 9 is a schematic diagram of the upper surface of the humidity sensing element 1 according to the second embodiment. The humidity sensing element 1 shown in FIG. 9 has the same components as the humidity sensing element 1 shown in FIG. 1, and descriptions for the components will be omitted.

What makes the humidity sensing element 1 in FIG. 9 different from the humidity sensing element 1 in FIG. 1 is that the voltage with the rectangular wave is applied to the application electrode 2.

Figure 10:
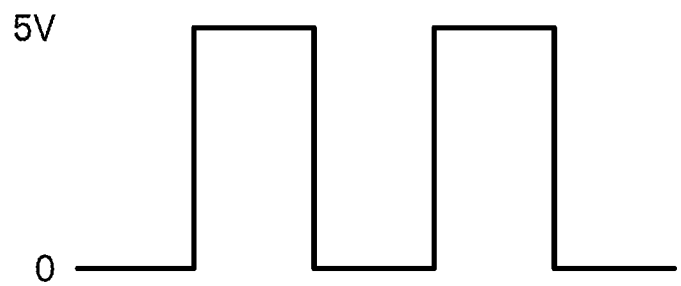
FIG. 10 is a diagram showing an example of a waveform of an input voltage Vi.

FIG. 10 is a diagram showing an example of the waveform of the input voltage Vi.

With regard to the rectangular wave of the input voltage Vi, the pulse amplitude is 5V; the frequency is 10 Hz; and the duty ratio is 50%.

Figure 11:
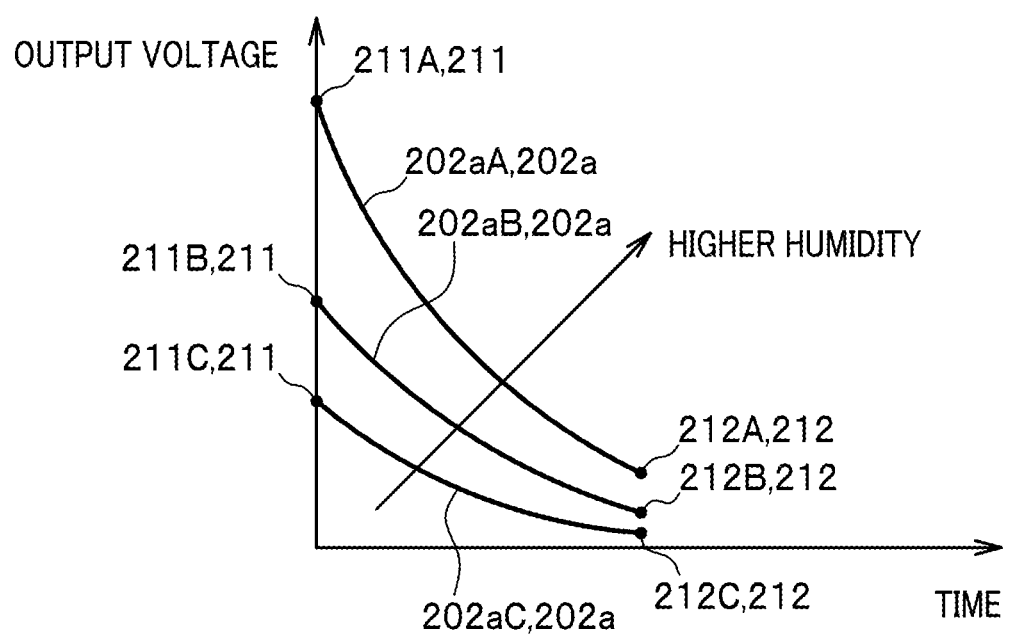
FIG. 11 is a schematic diagram showing how a downward slope part 202a shown in FIGS. 13 and 15 changes with humidity.

FIG. 11 will be discussed later.

Figure 12:
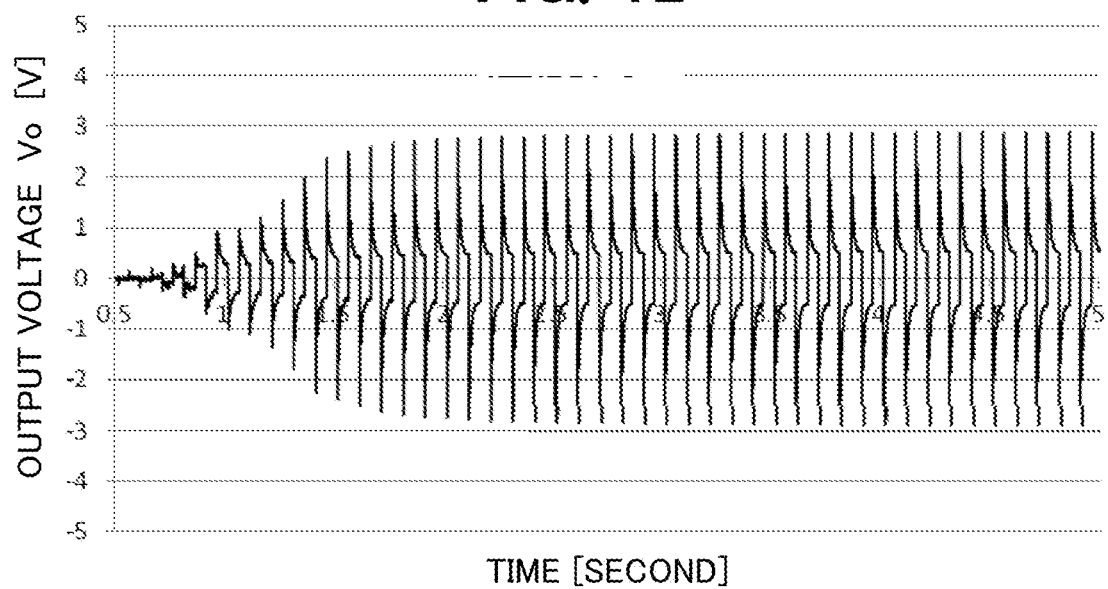
FIG. 12 is a diagram showing the output voltage Vo which is outputted from the humidity sensing element 1 shown in FIG. 9 when the input voltage Vi shown in FIG. 10 is applied to the humidity sensing element 1 at high humidity.
Figure 13:
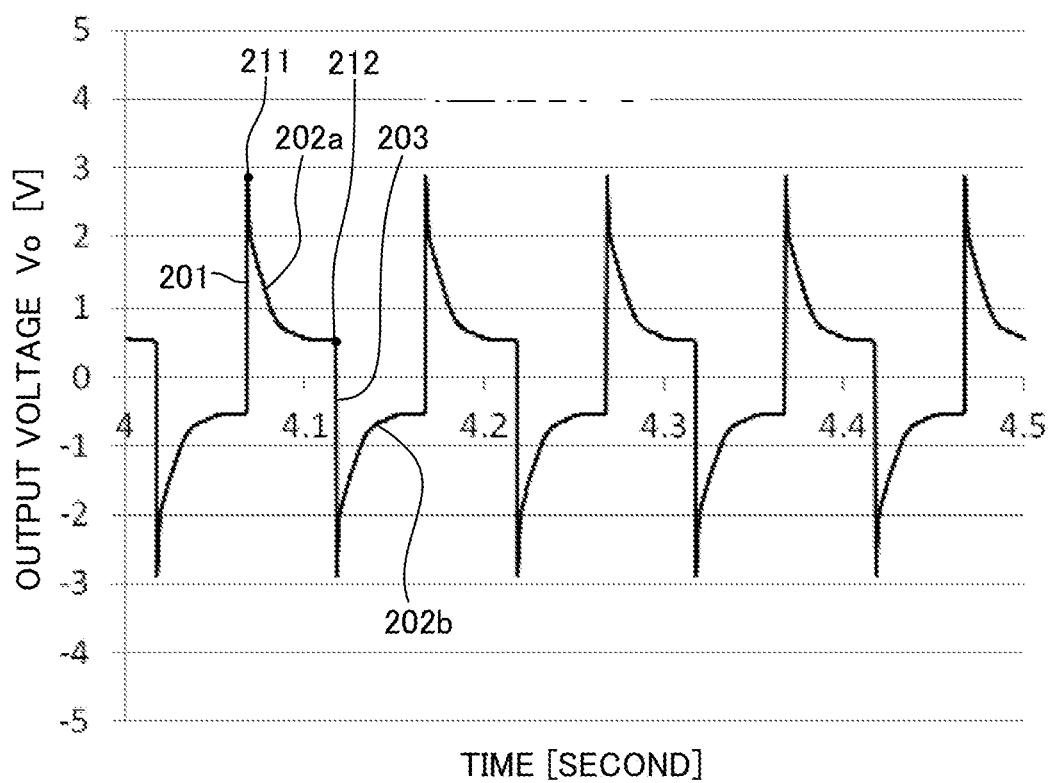
FIG. 13 is a magnified diagram of part of the waveform of the output voltage Vo shown in FIG. 12.

FIG. 12 is a diagram showing the output voltage Vo which is outputted from the humidity sensing element 1 shown in FIG. 9 when the input voltage Vi shown in FIG. 10 is applied to the humidity sensing element 1 at high humidity. FIG. 13 is a magnified diagram of part of the waveform of the output voltage Vo shown in FIG. 12.

As shown in FIG. 13, the waveform of the output voltage Vo includes: a sharp rising part 201; a downward slope part 202a following the sharp rising part 201; a sharp falling part 203 following the downward slope part 202a; and an upward slope part 202b following the sharp falling part 203.

In this respect, the rectangular wave shown in FIG. 10 is a combination of high- to low-frequency waveforms. In other words, the rectangular wave shown in FIG. 10 includes high- to low-frequency components. That is, the rectangular wave is a combined wave which includes two or more frequency components. Incidentally, although the rectangular-wave voltage is applied as the input voltage Vi in this embodiment, the input voltage Vi does not necessarily have to have the rectangular waveform as long as the input voltage Vi has a combine wave which includes two or more frequency components.

Amplitude 211 of the rising part 201 derives from the highest frequency components among the components included in the rectangular wave. Furthermore, an amplitude 212 coming immediately after the downward slope part 202a derives from the highest frequency components among the components included in the rectangular wave.

Figure 14:
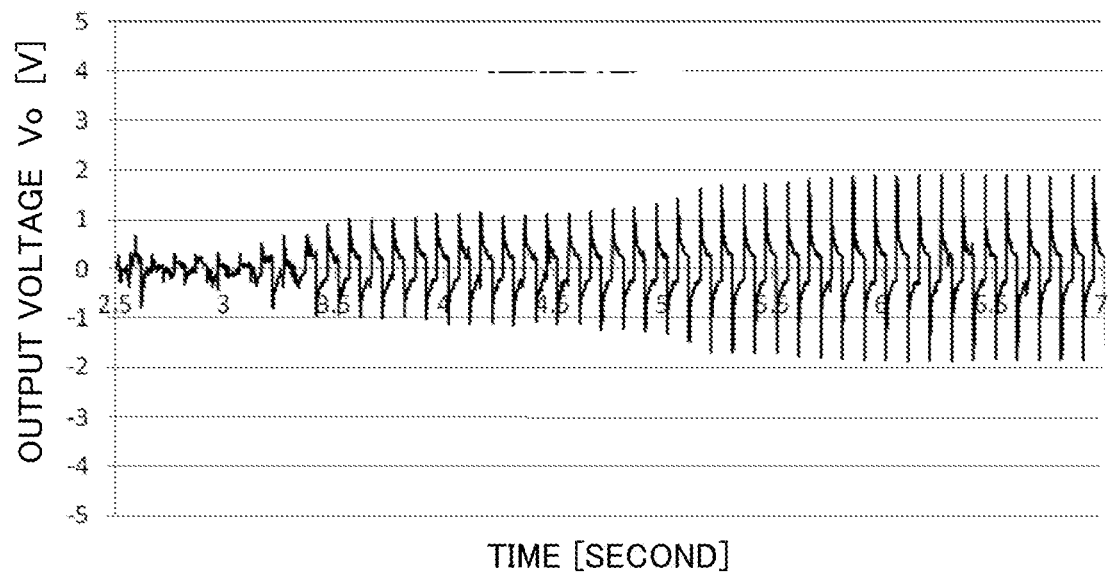
FIG. 14 is a diagram showing the output voltage Vo which is outputted from the humidity sensing element 1 shown in FIG. 9 when the input voltage Vi shown in FIG. 10 is applied to the humidity sensing element 1 at low humidity.
Figure 15:
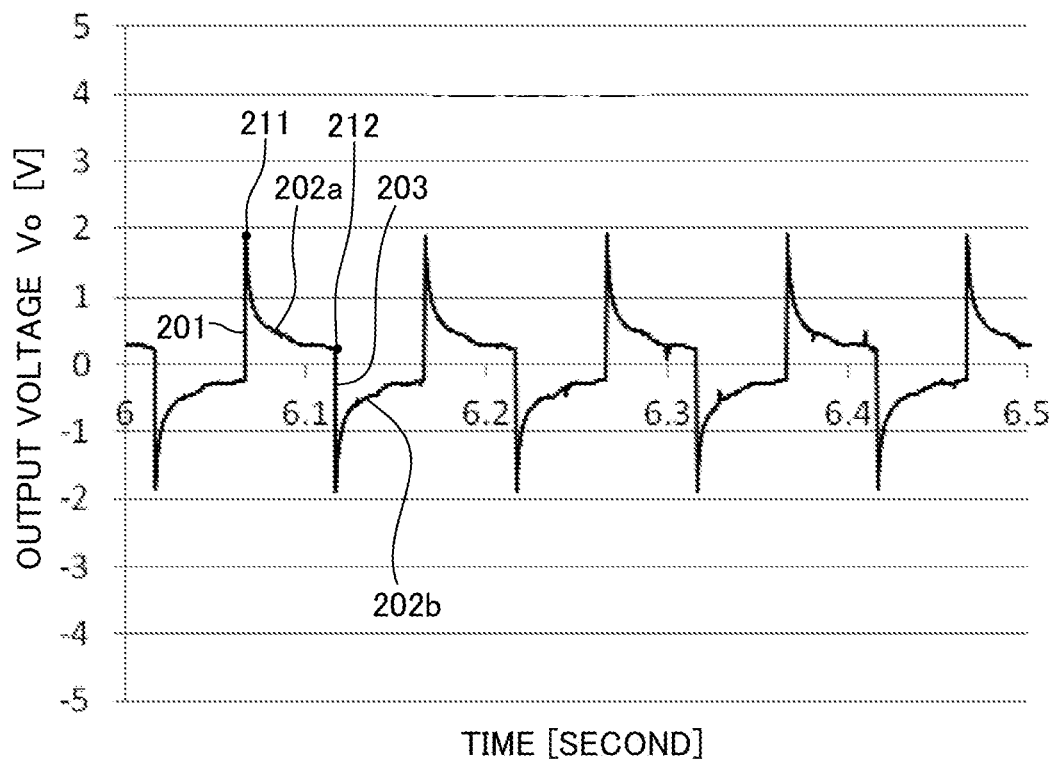
FIG. 15 is a magnified diagram of part of the waveform of the output voltage Vo shown in FIG. 14.

FIG. 14 is a diagram showing the output voltage Vo which is outputted from the humidity sensing element 1 shown in FIG. 9 when the input voltage Vi shown in FIG. 10 is applied to the humidity sensing element 1 at low humidity. FIG. 15 is a magnified diagram of part of the waveform of the output voltage Vo shown in FIG. 14. Incidentally, the components 201 to 203, 211 and 212 in FIG. 15 are the same as the components 201 to 203, 211 and 212 in FIG. 13, as well as descriptions for them will be omitted.

As clear from comparison between FIG. 12 and FIG. 14, the humidity sensing element 1 outputs a higher output voltage Vo at higher humidity (FIG. 12) than at lower humidity (FIG. 14).

Furthermore, as clear from comparison between FIG. 13 and FIG. 15, the value of the amplitude 211 of the rising part 201 is higher at higher humidity (FIG. 13) than at lower humidity (FIG. 15). Likewise, the value of the amplitude 212 coming immediately after the downward slope part 202a is higher at higher humidity (FIG. 13) than at lower humidity (FIG. 15).

Moreover, the second embodiment enables a double-check by calculating the arithmetic mean of the value of the amplitude 211 and the value of the amplitude 212 or doing the like. For this reason, the second embodiment can improve the data reliability.

Instead of the arithmetic mean of the value of the amplitude 211 and the value of the amplitude 212, however, the weighted mean may be calculated. The weighted means is obtained, for example, by adding up the value of the amplitude 211 multiplied by 0.8 and the value of the amplitude 212 multiplied by 0.2. Instead, the arithmetic mean or the weighted mean of the value of the amplitude 211, the value of the amplitude 212 and an arbitrary value of the downward slope part 202a may be used. A value of the upward slope part 202b may be used.

FIG. 11 is a diagram showing how the slope part 202*a* shown in FIGS. 13 and 15 changes with humidity.

In FIG. 11, the vertical axis represents the output voltage Vo, and the horizontal axis represents time.

Slopes 202*a*A to 202*a*C in FIG. 11 represent the downward slope part 202*a* in FIGS. 13 and 15. Amplitudes 211A to 211C (output voltage) correspond to the amplitude 211 in FIGS. 13 and 15. Amplitudes 212A to 212C (output voltage) correspond to the amplitude 212 in FIGS. 13 and 15. Incidentally, the slopes 202*a*A to 202*a*C do not exactly reflect the shapes of slope part 202*a* in FIGS. 13 and 15 because they are prepared for the purpose of facilitating understanding.

As the humidity becomes higher, the slope 202*a* shifts from the slope 202*a*C to the slope 202*a*B, and to the slope 202*a*A. Specifically, as shown in FIG. 11, as the humidity becomes higher, the value of the amplitude 211 of the rise becomes larger, and the value of the amplitude 212 similarly becomes larger.

Incidentally the change in the upward slope part 202*b* with the humidity is an inversion on the time axis of FIG. 11.

The humidity sensing element 1 according to the second embodiment can improve the data reliability, as discussed using FIGS. 13 and 15.

Third Embodiment

Figure 16:
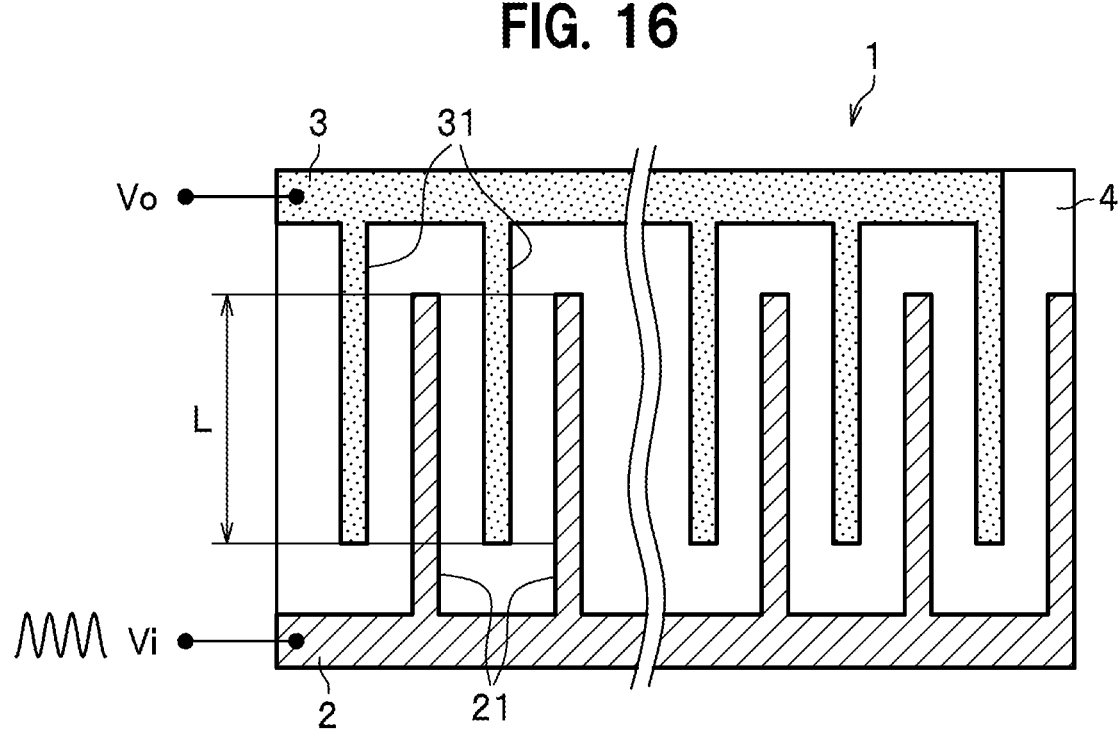
FIG. 16 is a schematic diagram of the upper surface of a humidity sensing element 1 according to a third embodiment.
Figure 17:
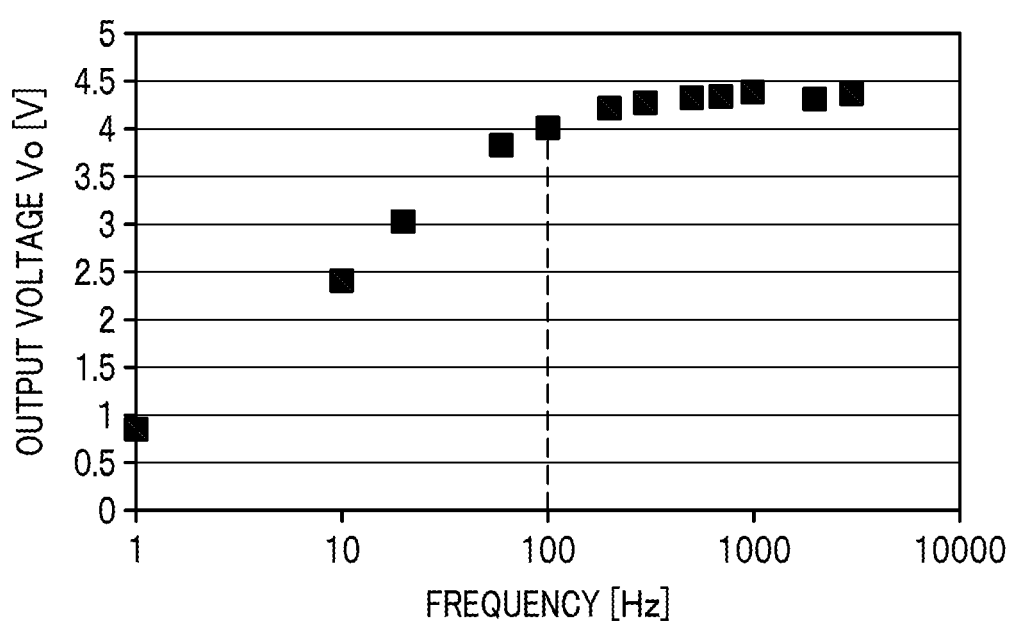
FIG. 17 is a graph showing a relationship between the frequency of the input voltage Vi used for the humidity sensing element 1 shown in FIG. 16 and the output voltage Vo.

Next, referring to FIGS. 16 to 17, descriptions will be provided for a third embodiment of the present invention. The third embodiment is characterized in that a high-frequency AC voltage is applied to a humidity sensing element 1 having the configuration of the first embodiment.

FIG. 16 is a schematic diagram of the upper surface of the humidity sensing element 1 according to a third embodiment.

The humidity sensing element 1 in FIG. 16 has the same components as the humidity sensing element 1 in FIG. 1, and descriptions for the components will be omitted.

What makes the humidity sensing element 1 in FIG. 16 different from the humidity sensing element 1 in FIG. 1 is that the high-frequency AC voltage is applied to the application electrode 2.

Referring to FIG. 4, descriptions will be provided for a relationship between the detection sensitivity and the frequency.

Because of Condition A1 and Condition A2 discussed above, the values of the capacitances C1, C2 are not large. Thus, as learned from Equation (1), a smaller angular frequency $\omega$ of the input voltage Vi, that is, a smaller frequency f, makes the combined impedance Z larger, and thus decreases the detection sensitivity of the humidity sensing element 1. With this taken into consideration, the third embodiment uses the input voltage Vi with higher frequency f.

FIG. 17 is a graph showing a relationship between the frequency of the input voltage Vi used for the humidity sensing element 1 shown in FIG. 16 and the output voltage Vo. The graph shown here was obtained from an experiment.

In FIG. 17, the vertical axis represents the output voltage Vo (V), and the horizontal axis represents the frequency (Hz) of the input voltage Vi. Conditions for the humidity sensing element 1 used in this embodiment are the total electrode length L1 at 48 mm and the inter-electrode width W at 160 µm. In other words, the humidity sensing element 1 which satisfies Condition A1 and Condition A2 discussed above is used.

FIG. 17 shows that as the value of the output voltage Vo becomes lower, the detection sensitivity becomes lower. The lower detection sensitivity is undesirable.

FIG. 17 shows that after the frequency reaches 100 Hz, the output voltage Vo represented by plotted points almost did not increase. With this taken into consideration, the frequency of the input voltage Vi is set at 100 Hz or greater. Specifically, the frequency of the input voltage Vi is set at a value within a range ensuring that the amount of change in the output voltage Vo of the humidity sensing element 1 with the frequency is equal to or less than a predetermined value.

The humidity sensing element 1 according to the third embodiment can obtain an excellent detecting sensitivity, as discussed referring to FIG. 17.

Fourth Embodiment

Figure 18:
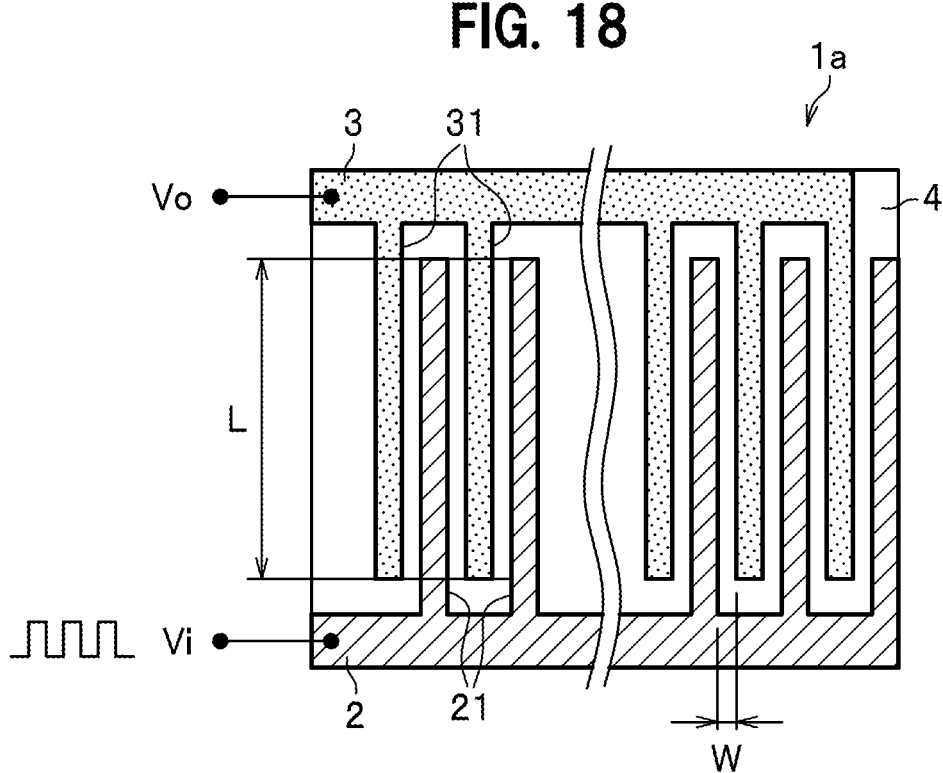
FIG. 18 is a schematic diagram of the upper surface of a humidity sensing element 1a according to a fourth embodiment.

Next, referring to FIG. 18, descriptions will be provided for a fourth embodiment of the present invention.

FIG. 18 is a schematic diagram of the upper surface of a humidity sensing element 1*a* according to a fourth embodiment.

In FIG. 18, components which are the same as those in FIG. 1 are denoted by the same reference signs. Descriptions for them will be omitted.

What makes the humidity sensing element 1*a* in FIG. 18 different from the humidity sensing element 1 in FIG. 1 is that the humidity sensing element 1*a* does not satisfy either of Conditions A1, A2 of the first embodiment.

Specifically, in the humidity sensing element 1*a*, W (inter-electrode width)<20 µm, and L1 (total electrode length)≥90 mm.

Furthermore, as the input voltage Vi, a rectangular-wave voltage is applied to the application electrode 2 in the humidity sensing element 1*a*. Incidentally, the rectangular wave is a combined wave which includes two or more frequency components, as discussed in the second embodiment. Furthermore, although the rectangular-wave voltage is applied as the input voltage Vi in this embodiment, the input voltage Vi does not necessarily have to have the rectangular waveform as long as the input voltage Vi has a combine wave which includes two or more frequency components.

The time waveforms of the output voltage Vo from the humidity sensing element 1*a* like this is the same as those shown in FIGS. 12 to 15, and the illustrations and descriptions for them will be omitted.

Like the second embodiment, the fourth embodiment can improve the data reliability even in the humidity sensing element 1*a* which does not satisfy Condition A1 or Condition A2.

Fifth Embodiment

Figure 19:
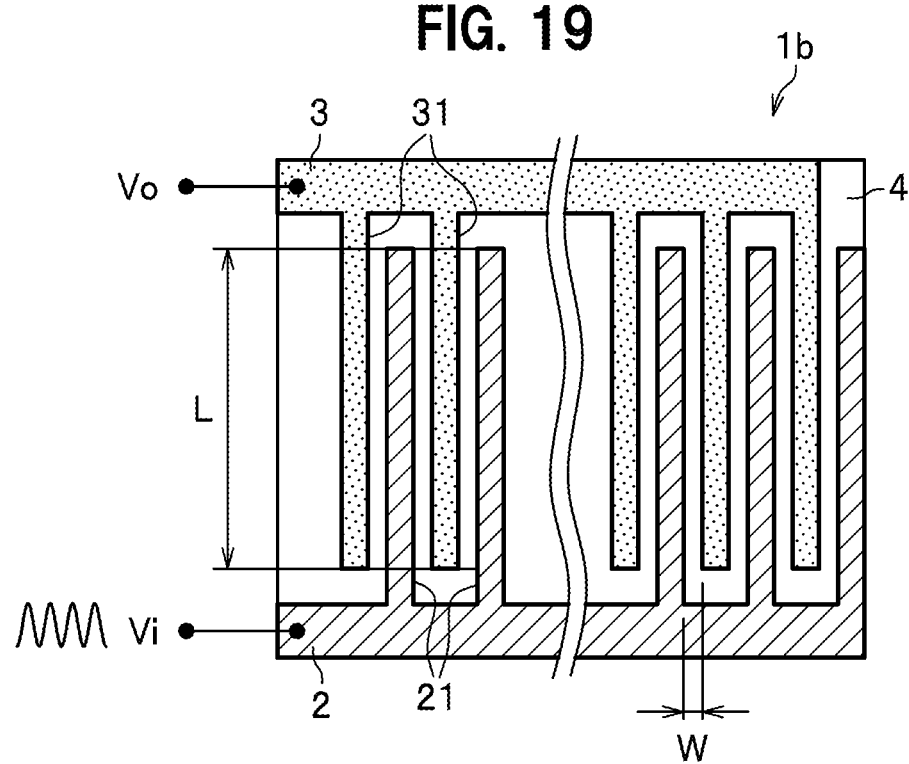
FIG. 19 is a schematic diagram of the upper surface of a humidity sensing element 1b according to a fifth embodiment.
Figure 20:
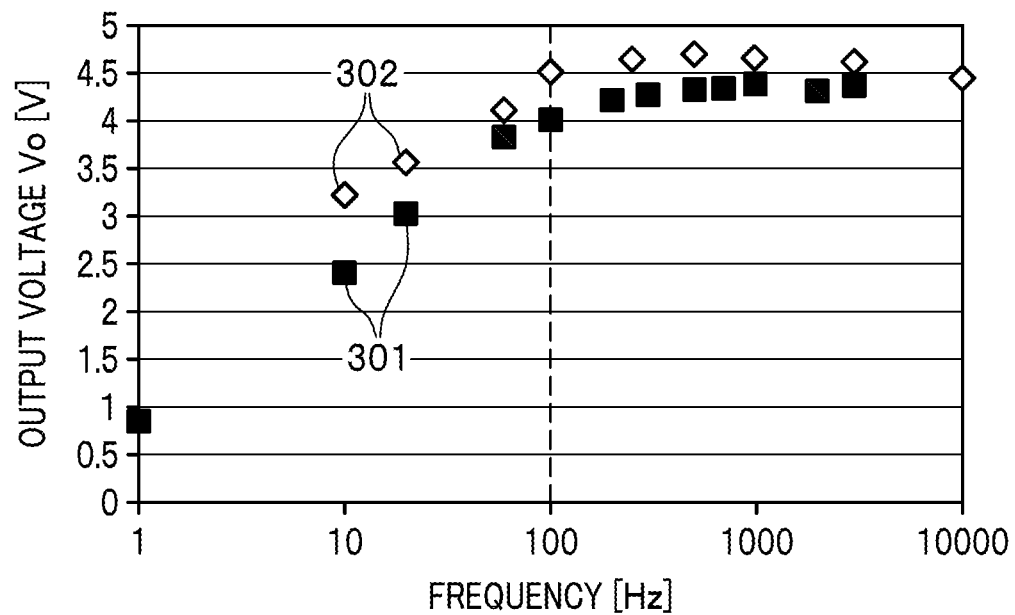
FIG. 20 is a graph showing a relationship between the frequency of the input voltage Vi used for a humidity sensing element 1b shown in FIG. 19 and the output voltage Vo.

Next, referring to FIGS. 19 and 20, descriptions will be provided for a fifth embodiment of the present invention.

FIG. 19 is a schematic diagram of the upper surface of a humidity sensing element 1*b* according to the fifth embodiment.

In FIG. 19, components which are the same as those in FIG. 1 are denoted by the same reference signs. Descriptions for them will be omitted.

What makes the humidity sensing element 1*b* in FIG. 19 different from the humidity sensing element 1 in FIG. 1 is that the humidity sensing element 1*b* does not satisfy either of Conditions A1, A2 of the first embodiment.

Specifically, in the humidity sensing element 1*b*, W (inter-electrode width)<20 and L1 (total electrode length)

≥90 mm. In other words, the humidity sensing element $1b$ has the same configuration as the humidity sensing element $1a$ shown in FIG. 18.

Furthermore, as the input voltage Vi, a sine-waveform AC voltage with a high frequency (100 Hz or higher) is applied to the application electrode 2. This makes the humidity sensing element $1b$ different from the humidity sensing element $1a$ shown in FIG. 18.

FIG. 20 is a graph showing a relationship between the frequency of the input voltage Vi used for the humidity sensing element $1b$ shown in FIG. 19 and the output voltage Vo. The graph shown here was obtained from an experiment.

In FIG. 20, the vertical axis represents the output voltage Vo (V), and the horizontal axis represents the frequency (Hz) of the input voltage Vi.

In FIG. 20, plotted points 301 (plotted square points) represent values which were obtained from the experiment using the humidity sensing element 1 where L1 (total electrode length)=48 mm and W (inter-electrode width)=160 μm. Specifically, the plotted points 301 are the same as the plotted points shown in FIG. 17, and represent the results obtained using the humidity sensing element 1 which satisfied Condition A1 and Condition A2.

In contrast to this, plotted points 302 (plotted white diamond points) represent values which were obtained from the experiment using the humidity sensing element 1 where L1 (total electrode length)=72 mm and W (inter-electrode width)=40 In other words, the plotted points 302 represent the values which were obtained from the experiment using the humidity sensing element $1b$ which did not satisfy Condition A2 of the first embodiment. In addition, the humidity sensing element 1 used when the plotted points 302 were obtained satisfied Condition A1, but its total electrode length L1 was longer than that in the humidity sensing element 1 used when the plotted points 301 were obtained.

As clear from FIG. 20, the plotted points 302 represent the larger values than the plotted points 301. This is because the humidity sensing element 1 where the total electrode length L1 is long and the inter-electrode width W is narrow (which satisfies Condition A1 but not Condition A2) is better in sensitivity than the humidity sensing element 1 where the total electrode length L1 is long and the inter-electrode width W is wide (which satisfies Condition A1 and Condition A2).

As shown in FIG. 20, after the frequency reaches 100 Hz, the output voltage Vo represented by the plotted points 302 almost did not increase. With this taken into consideration, the frequency of the input voltage Vi is set at 100 Hz or greater. Specifically, the frequency of the input voltage Vi is set at a value within a range ensuring that the amount of change in the output voltage Vo of the humidity sensing element $1b$ with the frequency is equal to or less than a predetermined value.

As discussed above, the fifth embodiment can realize the humidity sensing element $1b$ with a better sensitivity.

Sixth Embodiment

Figure 21:
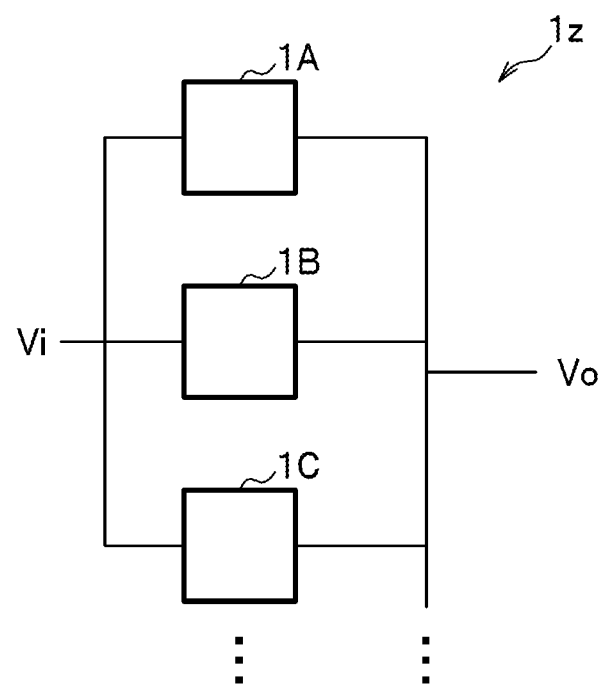
FIG. 21 is a diagram showing a humidity sensing element 1z according to a sixth embodiment.

FIG. 21 is a diagram showing a humidity sensing element $1z$ according to a sixth embodiment.

In the humidity sensing element $1z$ shown in FIG. 21, multiple humidity sensing elements 1A, 1B, 1C, . . . are connected together in parallel.

The humidity sensing elements 1A, 1B, 1C, . . . are each formed of the humidity sensing element 1 of the first embodiment. The humidity sensing elements 1A, 1B, 1C, . . . , however, are different from one another in the total electrode length L1 and/or the inter-electrode width W. For example, the inter-electrode width W of the humidity sensing element 1A is denoted by reference sign WA, the inter-electrode width W of the humidity sensing element 1B is denoted by reference sign WB, and the inter-electrode width W of the humidity sensing element 1C is denoted by reference sign WC. A relationship among WA, WB and WC is defined as satisfying 20 μm<WA<WB<WC. The input voltage Vi is applied to all the humidity sensing elements 1A, 1B, 1C, . . . .

Although FIG. 21 shows a configuration where three or more humidity sensing elements 1A, 1B, 1C, . . . are connected together, a configuration where two humidity sensing elements 1A, 1B are connected together may be employed.

The above configuration makes it possible to continue measuring humidity using the humidity sensing element 1B even if the combined capacitance C of the humidity sensing element 1A becomes saturated (see FIG. 6). Furthermore, the above configuration makes it possible to continue measuring humidity using the humidity sensing element 1C even if the combined capacitance C of the humidity sensing element 1B becomes saturated. The same result can be obtained even in a case where the total electrode length L1 is changed instead of the inter-electrode width W.

This parallel connection of the humidity sensing elements 1A, 1B, 1C, . . . which are different from one another in the total electrode length L1 and/or the inter-electrode width W makes it possible to widen the dynamic range of the output voltage Vo (detected voltage).

Although the example where the humidity sensing elements 1 of the first embodiment are connected together in parallel is shown here, the humidity sensing elements 1, $1a$, $1b$ of the second to fifth embodiments may be connected together in parallel. This connection also can widen the dynamic range of the output voltage Vo.

For example, in the case where the humidity sensing elements 1 of the second embodiment are used as the humidity sensing elements 1A, 1B, 1C, . . . , the duty ratio or the like is made slightly different among the humidity sensing elements 1A, 1B, 1C, . . . .

In the case where the humidity sensing elements 1 of the third embodiment are used as the humidity sensing elements 1A, 1B, 1C, . . . , the frequency to be applied is made slightly different among the humidity sensing elements 1A, 1B, 1C, . . . .

In the case where the humidity sensing elements $1a$ of the fourth embodiment are used as the humidity sensing elements 1A, 1B, 1C, . . . , the duty ratio or the like is made slightly different among the humidity sensing elements 1A, 1B, 1C, . . . .

In the case where the humidity sensing elements $1b$ of the fifth embodiment are used as the humidity sensing elements 1A, 1B, 1C, . . . , the frequency to be applied is made slightly different among the humidity sensing elements 1A, 1B, 1C, . . . .

FIGS. 22A to 22C are diagrams showing a humidity sensing element $1w$ according to the sixth embodiment. FIG. 22A shows the upper surface of the humidity sensing element $1w$. FIG. 22B is a schematic diagram showing a principle of how the humidity sensing element $1w$ of low-temperature type works. FIG. 22C is a schematic diagram showing a principle of how the humidity sensing element $1w$ of high-temperature type works.

In the humidity sensing element 1w, the humidity sensing element 1D of low-temperature type and the humidity sensing element 1E of high-temperature type are connected together in parallel.

Furthermore, in the humidity sensing elements 1D, 1E included in the humidity sensing element 1w, the insulation section 4 includes the uneven portion 6, as discussed above.

As shown in FIG. 22, the uneven portion 6 can be classified into: low-temperature type to be used in a low-temperature environment (an environment at a predetermined or lower temperature); and high-temperature type to be used in a high-temperature environment (an environment at a predetermined or higher temperature).

Specifically, as shown in FIG. 22B, the unevenness of the uneven portion 6a (6) of the humidity sensing element 1D of low-temperature type is smaller than that of the humidity sensing element 1E of high-temperature type. Conversely, as shown in FIG. 22C, the unevenness of the uneven portion 6b (6) of the humidity sensing element 1E of high-temperature type is larger than that of the humidity sensing element 1D of low-temperature type.

When temperature is high, the amount of saturated steam is large, and the humidity (relative humidity) is low. With this taken into consideration, the unevenness of the uneven portion 6b of the humidity sensing element 1E of high-temperature type is made larger to make moisture (water molecules 11 (see FIG. 3)) likely to adhere to the humidity sensing element 1E than the humidity sensing element 1D. This makes it possible to provide the humidity sensing element 1E which works appropriately even in the high-temperature environment where the humidity is low.

Conversely, when temperature is low, the amount of saturated steam is small, and the humidity (relative humidity) is high. Under this condition, in a case where the unevenness of the uneven portion 6 is large like in the humidity sensing element 1E of high-temperature type, too much of moisture (water molecules 11) adheres to the uneven portion 6. With this taken into consideration, the unevenness of the uneven portion 6a of the humidity sensing element 1D of low-temperature type is made smaller to make moisture (water molecules 11) less likely to adhere to the humidity sensing element 1D than the humidity sensing element 1E. This makes it possible to provide the humidity sensing element 1D which works appropriately even in the low-temperature environment where the humidity is high.

Besides, as shown in FIG. 22A, the AC power supply 5 applies the AC voltage to the humidity sensing element 1D of low-temperature type and the humidity sensing element 1E of high-temperature type. This configuration makes it possible to provide the humidity sensing element 1w which can be used in both the low-temperature environment and the high-temperature environment.

Although the example shown in FIGS. 22A to 22C show that two types of unevenness, that is, the high-temperature type and the low-temperature type are used in the uneven portion 6, three or more types of unevenness may be used in the uneven portion 6. In other words, the unevenness of the insulation section 4 may be made to become larger from the low-temperature type to the high-temperature type (e.g., shown as insulation section 4a in FIGS. 22A to 22B and as insulation section 4b in FIGS. 22A and 22C) to provide the humidity sensing element 1w which has the insulation section 4 suitable for intermediate temperature between the low temperature and the high temperature. Otherwise, the humidity sensing element 1D of low-temperature type and the humidity sensing element 1E of high-temperature type may be switchable depending on ambient temperature.

Meanwhile, the unevenness of the uneven portion 6 may be formed in the shape having many mountains as shown in FIGS. 22B and 22C, or in a shape having many protrusions. Otherwise, the unevenness of the uneven portion 6 may be formed in a random shape or the like, other than in the shape having many mountains or in the shape having many protrusions.

The humidity sensing elements 1, 1a, and 1b of the first to fifth embodiments may be used as the humidity sensing element 1D of low-temperature type and the humidity sensing element 1E of high-temperature type. Specifically, in the case where the inter-electrode width W and the total electrode length L1 of the humidity sensing elements 1D, 1E satisfy Condition A1 and/or Condition A2 discussed above, the humidity sensing elements 1 of the first to third embodiments may be used. In the case where the voltage to be applied to the application electrodes 2 of the respective humidity sensing elements 1D, 1E have the rectangular wave, the second and fourth embodiments are applied. In addition, in the case where the voltage to be applied to the application electrodes 2 of the respective humidity sensing elements 1D, 1E is the AC voltage with a high frequency (equal to 100 Hz or higher), the second and fourth embodiments are applied.

Seventh Embodiment

Next, as a seventh embodiment of the present invention, a hygrometer 400 including the humidity sensing element 1 (1a, 1b, 1z) will be described.

Figure 23:
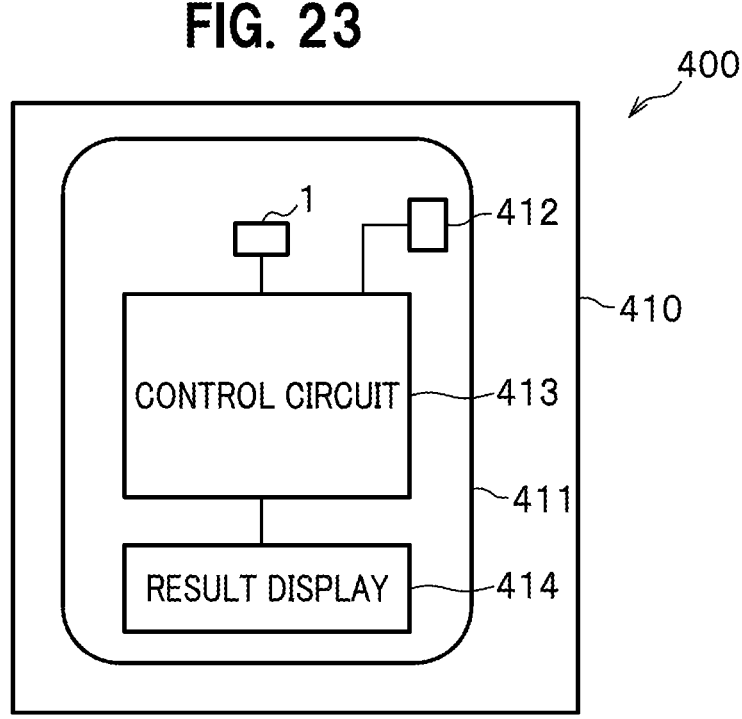
FIG. 23 is a diagram showing an example of a configuration of a hygrometer 400 according to a seventh embodiment.

FIG. 23 is a diagram showing an example of a configuration of the hygrometer 400 according to the seventh embodiment.

The hygrometer 400 includes the humidity sensing element 1, a temperature sensing element 412, a control circuit (main unit) 413 and a result display 414 which are all mounted on a circuit board 411.

The humidity sensing element 1 of the first to third embodiments, the humidity sensing element 1a of the fourth embodiment, the humidity sensing element 1b of the fifth embodiment, and the humidity sensing element 1z of the sixth embodiment may be used as the humidity sensing element 1.

The temperature sensing element 412 measures ambient temperature. The ambient temperature obtained by the temperature sensing element 412 is used to do things such as correcting humidity, and calculating a discomfort index, an amount of saturated steam, and absolute humidity. Since the hygrometer 400 includes the temperature sensing element 412 like this, the hygrometer 400 is capable of doing things such as correcting the humidity, and calculating the discomfort index, the amount of saturated steam, and the absolute humidity.

The result display 414 displays things such as the humidity detected by the humidity sensing element 1.

The control circuit 413 converts the output voltage Vo of the humidity sensing element 1 into humidity. The control circuit 413 performs this conversion based on an output voltage vs. humidity conversion map or the like which is stored in the control circuit 413 in advance.

Depending on the necessity, the control circuit 413 corrects the humidity using the ambient temperature measured by the temperature sensing element 412. Subsequently, the control circuit 413 displays the humidity and the like on the result display.

The circuit board 411 shown in FIG. 23 is contained in the housing 410. The circuit board 411 measures the ambient humidity, and measures humidity in an exhalation when the exhalation is blown against the hygrometer.

Figure 24:
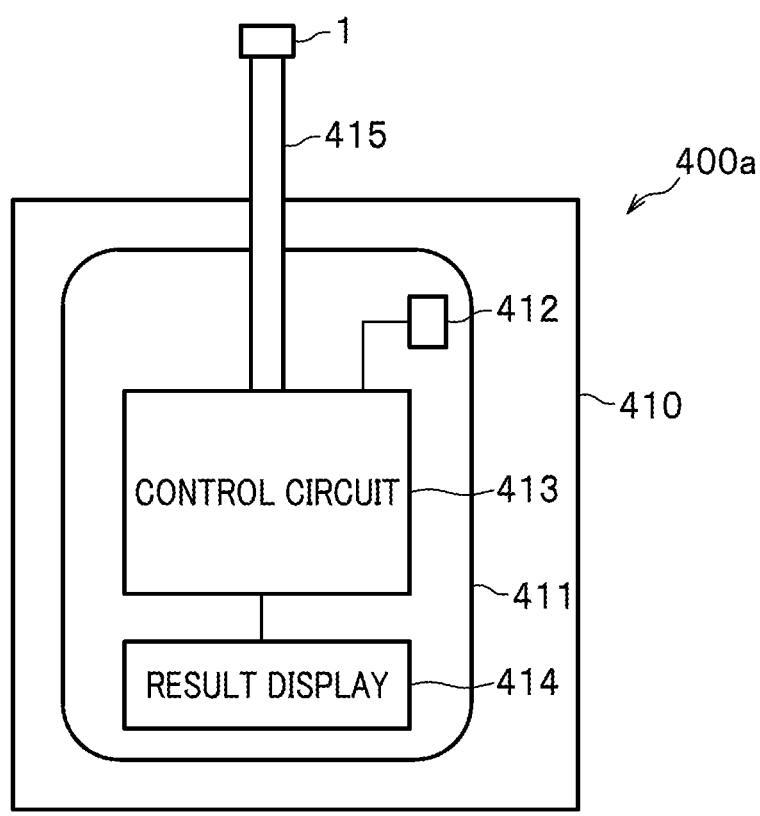
FIG. 24 is a diagram showing an example of a configuration of another hygrometer 400a according to the seventh embodiment.

FIG. 24 is a diagram showing an example of the configuration of another hygrometer 400*a* according to the seventh embodiment.

In FIG. 24, components which are the same as those in FIG. 23 are denoted by the same reference signs. Descriptions for them will be omitted.

What makes the hygrometer 400*a* in FIG. 24 different from the hygrometer 400 in FIG. 23 is that the humidity sensing element 1 is connected to the control circuit 413 using a cable 415. The humidity sensing element 1 is arranged outside the housing 410 using the cable 415.

This arrangement makes it possible for the hygrometer 400*a* to measure humidity in a narrow space or the like when the humidity sensing element 1 is inserted into the narrow space or the like.

Figure 25:
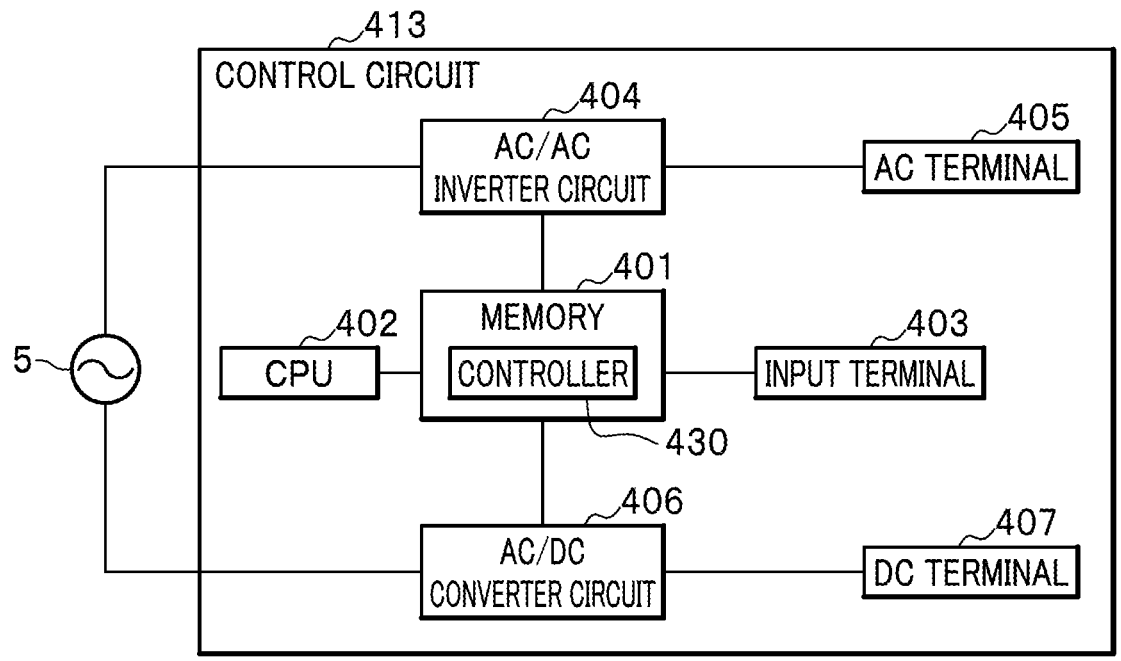
FIG. 25 is a functional block diagram showing a configuration of a control circuit 413 for generating a high-frequency AC voltage.

FIG. 25 is a functional block diagram showing the configuration of the control circuit 413 for generating a high-frequency AC voltage.

The control circuit 413 includes a memory 401, a central processing unit (CPU) 402, an input terminal 403, an AC//AC inverter circuit 404, an AC terminal 405, an AC//DC converter circuit 406 and a DC terminal 407.

The CPU 402 implements the controller 430 by executing a program stored in the memory 401.

Based on information inputted using an input device (not shown), the controller 430 sends instructions to the AC//AC inverter circuit 404 and the AC//DC converter circuit 406.

Based on instructions sent from the controller 430, the AC//AC inverter circuit 404 converts the frequency and voltage of the AC voltage inputted from the AC power supply 5, and outputs the results to the AC terminal 405. The humidity sensing element 1 is connected to the AC terminal 405.

Meanwhile, based on instructions sent from the controller 430, the AC//DC converter circuit 406 converts the voltage of the AC voltage inputted from the AC power supply 5, and coverts the AC current into a DC current. Thereafter, the AC//DC converter circuit 406 sends the results to the DC terminal 407. The temperature sensing element 412 is connected to the DC terminal 407.

What is shown in FIG. 25 is an example of the configuration of the control circuit 413, and the configuration of the control circuit 413 is not limited to what is shown in FIG. 25. For example, a crystal oscillator may be used to generate an AC signal (AC voltage).

The humidity sensing element 1 and the temperature sensing element 412 are connected to the input terminal 403. A detection signal from the humidity sensing element 1 and a detection signal from the temperature sensing element 412 are inputted into the input terminal 403.

It should be noted that the temperature sensing element 412 may be omitted.

The control circuit 413 shown in FIG. 25 is used in the humidity sensing element 1 of the third embodiment and the humidity sensing element 1*b* of the fifth element.

Figure 26:
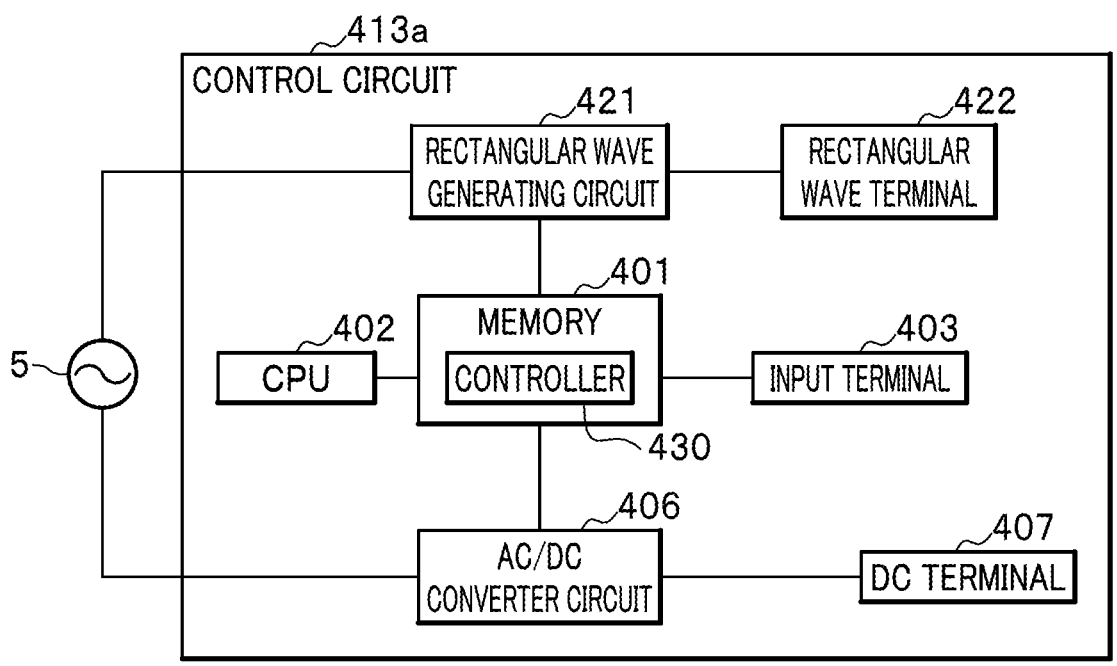
FIG. 26 is a functional block diagram showing a configuration of a control circuit 413a for generating a rectangular-wave AC voltage.

FIG. 26 is a functional block diagram showing the configuration of a control circuit 413*a* for generating a rectangular-wave AC voltage.

In FIG. 26, components which are the same as those shown in FIG. 25 are denoted by the same reference signs. Descriptions for such components will be omitted.

What make the control circuit 413*a* in FIG. 26 different from the control circuit 413 in FIG. 25 are twofold as follows.

(1) Instead of the AC//AC inverter circuit 404, a rectangular wave generating circuit 421 is arranged in the control circuit 413*a*.

(2) The rectangular wave generating circuit 421 is connected to a rectangular wave terminal 422.

This configuration makes the control circuit 413*a* output the rectangular wave from the rectangular wave terminal 422. The control circuit 413*a* shown in FIG. 26 is used in the humidity sensing element 1 of the second embodiment, and the humidity sensing element 1*a* of the fourth embodiment.

Figure 27:
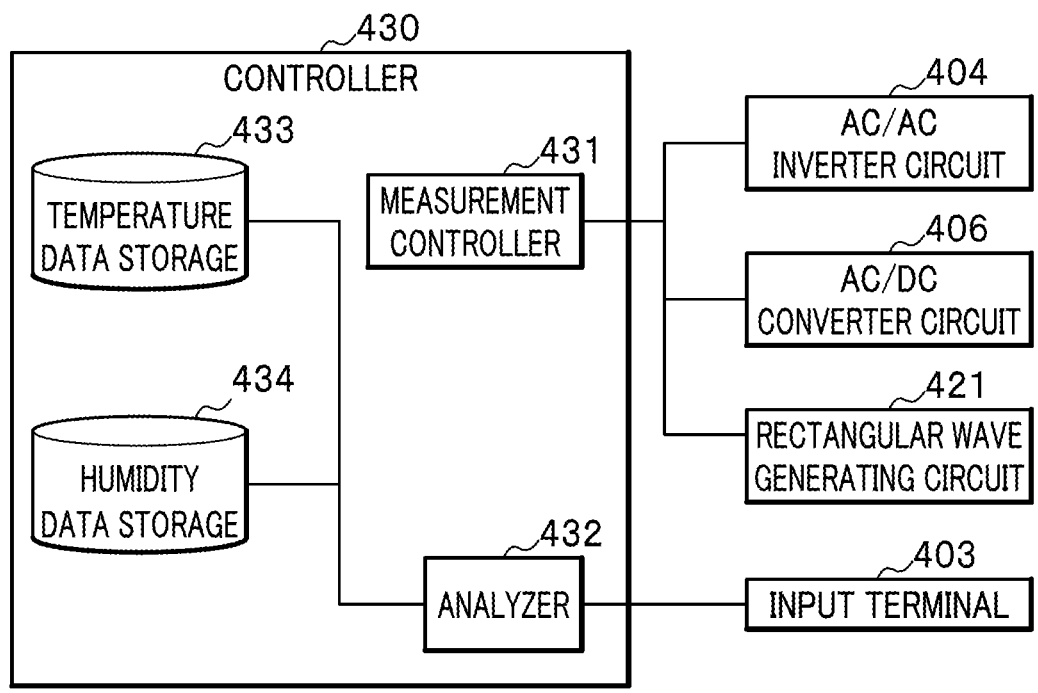
FIG. 27 is a functional block diagram showing a configuration of a controller 430 used in the seventh embodiment.

FIG. 27 is a functional block diagram showing the configuration of the controller 430 used in the seventh embodiment.

The controller 430 is the controller 430 in FIGS. 25 and 26.

The controller 430 includes a measurement controller 431, an analyzer 432, a temperature data storage 433 and a humidity data storage 434.

Based on a frequency inputted using the input device (not shown), the measurement controller 431 controls the AC/AC inverter circuit 404. Thus, the AC/AC inverter circuit 404 outputs an AC voltage with the frequency inputted using the input device. Furthermore, the measurement controller 431 controls the AC/DC converter circuit 406. Thus, the AC/DC converter circuit 406 outputs an optimum DC voltage to the temperature sensing element 412.

Furthermore, based on a duty ratio and the like inputted using the input device (not shown), the measurement controller 431 controls the rectangular wave generating circuit 421. Incidentally, the control of the rectangular wave generating circuit 421 by the measurement controller 431 is achieved in a case where the controller 430 is mounted on the control circuit 413*a* shown in FIG. 26. Thus, a rectangular-wave voltage with the duty ratio inputted using the input device is outputted from the rectangular wave terminal 422.

The analyzer 432 converts the detection signals of the humidity sensing element 1 and the temperature sensing element 412, which are inputted from the input terminal 403, into humidity and temperature. Specifically, based on the map and the like stored in the memory 401 in advance, the analyzer 432 converts the detection signals into the humidity and temperature. Furthermore, the analyzer 432 does things such as calculating the discomfort index, the amount of saturated steam and the absolute humidity based on the temperature, as discussed above.

Each time the analyzer 432 converts a detection signal into temperature, the temperature data storage 433, for example chronologically, stores the value representing the temperature. Each time the analyzer 432 converts a detection signal into humidity, the humidity data storage 434, for example chronologically, stores a value representing the humidity.

It should be noted that the controller 430 may be implemented on a personal computer (PC). In other words, the memory 401 and the CPU 402 shown in FIG. 25 or 26 may be mounted on the PC.

Otherwise, only the measurement controller 431 may be implemented by the control circuit 413. In this case, the analyzer 432 may be implemented on the PC, while the temperature data storage 433 and the humidity data storage 434 may be mounted on the PC.

(Modifications)

Figure 28:
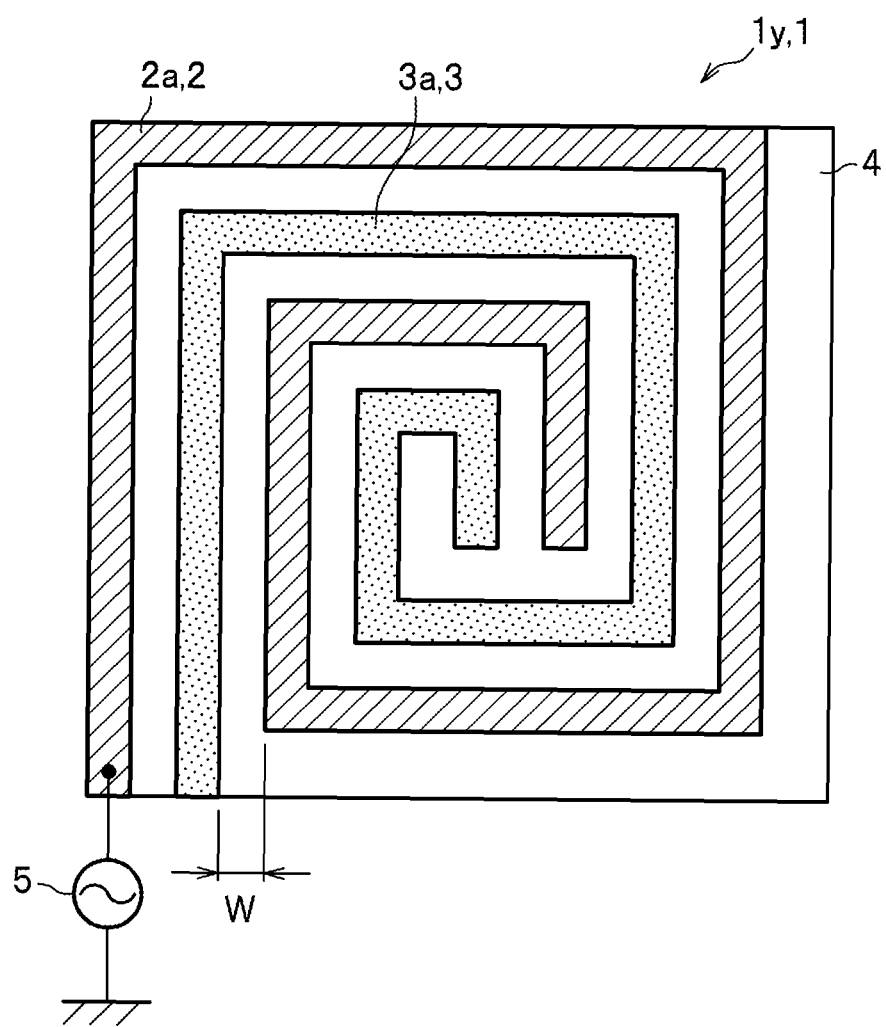
FIG. 28 is a diagram showing a humidity sensing element 1y according to the seventh embodiment.

FIG. 28 is a diagram showing a humidity sensing element 1*y* according to the seventh embodiment. Incidentally, in FIG. 28, components which are the same as those in FIG. 1 are denoted by the same reference signs, and descriptions for such components will be omitted.

In the humidity sensing element 1y (1) shown in FIG. 28, an application electrode 2a (2) and an output electrode 3a (3) are coil-shaped. Like this, the application electrode 2 or the output electrode 3 do not necessarily have to be teeth-shaped, unlike those in shown in FIG. 1.

In a case where the inter-electrode width W and the total electrode length L1 of the humidity sensing element 1y in FIG. 28 satisfy Condition A1 and/or Condition A2 discussed above, the humidity sensing element 1y works in the same way as the humidity sensing elements 1 according to the first to third embodiments.

Otherwise, in a case where a rectangular-wave voltage is applied to the application electrode 2a of the humidity sensing element 1y in FIG. 28, the humidity sensing element 1y works in the same way as the humidity sensing elements 1, 1a according to the second and fourth embodiments.

Besides, in a case where a high-frequency AC voltage with a frequency equal to or higher than 100 Hz is applied to the application electrode 2a of the humidity sensing element 1y in FIG. 28, the humidity sensing element 1y works in the same way as the humidity sensing elements 1, 1b according to the third and fifth embodiments.

The present invention is not limited to the foregoing embodiments, and includes various modifications. For example, the foregoing embodiments are what are described in detail for the purpose of making the present invention easier to understand, and the present invention is not necessarily limited to what include all the discussed components. Furthermore, a modification can be obtained from any embodiment by replacing some of the components included in the embodiment with components included in another embodiment. Otherwise, a modification can be obtained from any embodiment by adding some of the components included in another embodiment to the components included in the embodiment. Moreover, a modification can be obtained from each embodiment by adding other components to the components included in the embodiment, by eliminating some components from the components included in the embodiment, or by replacing some of the components included in the embodiment with other components.

For example, in a case where the humidity sensing element 1 (1a, 1b, 1w, 1y, 1z) according to each embodiment is used in combination with an alcohol sensor, the humidity sensing element 1 (1a, 1b, 1w, 1y, 1z) can be used to detect alcohol. In this respect, the alcohol sensor is a combination of an ethanol sensor, an acetaldehyde sensor, a hydrogen sensor and the like. Particularly after the humidity sensing element 1 detects that a sufficient amount of exhalation is introduced into the humidity sensing element 1, the alcohol sensor is capable of determining whether or not an alcohol concentration detected by the alcohol sensor is that in the exhalation.

The third and fifth embodiments are based on the assumption that the voltage to be applied to the humidity sensing elements 1, 1b is the single-frequency AC voltage with a frequency equal to or higher than 100 Hz. However, the voltage to be applied to the humidity sensing elements 1, 1b is not limited to this. A voltage including multiple frequency components may be applied to the humidity sensing elements 1, 1b as long as the voltage includes at least a frequency component with a frequency equal to or higher than 100 Hz.

It should be noted that the humidity sensing element 1 (1a, 1b, 1w, 1y, 1z) of each embodiment is capable of measuring humidity in a length of time which is as short as several seconds.

Some or all of the components, the functions, the units 430 to 432, the temperature date storage 433, the humidity data storage 434 and the like, which have been discussed above, may be implemented as hardware by being designed, for example, on an integrated circuit. Furthermore, the above-discussed components, functions and the like shown in FIGS. 25 and 26 may be implemented as software such that processors such as the CPU 402 interpret and execute programs for implementing the functions. Information on the programs for implementing the functions, tables, files and the like may be stored in a recording device such as the memory 401 or a solid state drive (SSD), or a recording medium such as an integrated circuit (IC) card, a secure digital (SD) card or a digital versatile disc (DVD), in addition to being stored in a hard disk (HD).

Furthermore, each embodiment shows only control lines and information lines which are necessary for the descriptions, but all the control lines or all the information lines in the products are shown there. It may be considered that almost all the components are connected together.

14. A hygrometer including a humidity sensing element, wherein
the humidity sensing element comprises
an insulation section made of an insulating material,
an application section to which a voltage is applied, and
an output section which outputs a voltage signal corresponding to an electrical current flowing through an electrical path via water molecules adhering to a surface of the insulating material in response to the voltage applied to the application section, and
a distance between an application electrode as an electrode forming the application section and an output electrode as an electrode forming the output section is set at a value with which an amount of change in capacitance produced between the application electrode and the output electrode with respect to humidity is equal to or greater than a predetermined value.

15. The hygrometer according to claim 14, wherein
in the humidity sensing element, a total sum of lengths of portions where the application electrode and the output electrode face each other is set at a value with which the amount of change in the capacitance produced between the application electrode and the output electrode with respect to the humidity is equal to or greater than a predetermined value.

16. A hygrometer including a humidity sensing element, wherein
the humidity sensing element comprises
an insulation section made of an insulating material,
an application section to which a voltage is applied, and
an output section which outputs a voltage signal corresponding to an electrical current flowing through an electrical path via water molecules adhering to a surface of the insulating material in response to the voltage applied to the application section, and
a total sum of lengths of portions where an application electrode as an electrode forming the application section and an output electrode as an electrode forming the output section face each other is set at a value with which an amount of change in capacitance produced between the application electrode and the output electrode with respect to humidity is equal to or greater than a predetermined value.

According to an example implementation, a hygrometer including a humidity sensing element is provided, wherein
the humidity sensing element comprises
an insulation section made of an insulating material,
an application section to which a voltage with a combined wave including two or more frequency components is applied, and
an output section which outputs a voltage signal corresponding to an electrical current flowing through an electrical path via water molecules adhering to a surface of the insulating material in response to the voltage applied to the application section.

According to another example implementation, a hygrometer including a humidity sensing element is provided, wherein
the humidity sensing element comprises
an insulation section made of an insulating material,
an application section to which an alternating current voltage is applied, and
an output section which outputs a voltage signal in response to the voltage applied to the application section, corresponding to an electrical current flowing through an electrical path made from water molecules adhering to a surface of the insulating material, and
a frequency of the alternating current voltage is set at a value within a range where an amount of change in an output voltage from the humidity sensing element with respect to the frequency is equal to or less than a predetermined value.

Accordingly to still another example implementation, the hygrometer includes a temperature sensing element.

What is claimed is:

1. A humidity sensing element comprising:
first and second humidity sensing elements connected together in parallel;
wherein the first humidity sensing element comprises:
a first insulation section made of a first insulating material and comprising a first uneven portion;
a first application section to which a voltage is applied; and
a first output section which outputs a voltage signal corresponding to an electrical current flowing through a first electrical path via water molecules adhering to a surface of the first insulating material in response to the voltage applied to the first application section;
wherein the second humidity sensing element comprises:
a second insulation section made of a second insulation material and comprising a second uneven portion;
a second application section to which a voltage is applied; and
a second output section which outputs a voltage signal corresponding to an electrical current flowing through a second electrical path via water molecules adhering to a surface of the second insulating material in response to the voltage applied to the second application section;
wherein a total sum of lengths of portions where a first application electrode as an electrode forming the first application section and a first output electrode as an electrode forming the first output section face each other is set at a value with which an amount of change in capacitance produced between the first application electrode and the first output electrode with respect to humidity is equal to or greater than a predetermined value,
wherein a total electrode length is less than 90 mm, wherein the total electrode length is a length of an area where a predetermined tooth of the first application electrode and a predetermined tooth of the first output electrode face each other, multiplied by a number of teeth of the first application electrode and the first output electrode, and
wherein a first width between the first application electrode as an electrode forming the first application section and the first output electrode as an electrode forming the first output section is set at a value between 20-160 µm; and
wherein the first humidity sensing element is of low-temperature type, the second humidity sensing element is of the high-temperature type, and an unevenness of the first uneven portion is smaller than an unevenness of the second uneven portion.

2. The humidity sensing element according to claim 1, wherein
the total sum of the lengths of the portions where the first application electrode and the first output electrode face each other are different from a total sum of lengths of portions where a second application electrode as an electrode forming the second application section and a second output electrode as an electrode forming the second output section face each other.

3. The humidity sensing element according to claim 1, wherein
the voltage applied to the first application section has a combined wave including two or more frequency components.

4. The humidity sensing element according to claim 1, wherein
the voltage applied to the first application section is an alternating current voltage, and
a frequency of the AC voltage is set at a value within a range where an amount of change in an output voltage from the first humidity sensing element with respect to the frequency is equal to or less than a predetermined value.

5. The humidity sensing element according to claim 1, wherein
the first insulation section includes a structure in which oxygen atoms are arranged at least on a surface of the first insulation section.

6. The humidity sensing element according to claim 5, wherein
the first insulation section is made of an insulating metal oxide.

7. The humidity sensing element according to claim 1, wherein
the first application section and the first output section are arranged with the teeth of the first application section and the teeth of the first output section meshed with each other.

8. A humidity sensing element comprising:
first and second humidity sensing elements connected together in parallel;
wherein the first humidity sensing element comprises:
a first insulation section made of a first insulating material and comprising a first uneven portion;
a first application section to which a voltage with a combined wave including two or more frequency components is applied; and
a first output section which outputs a voltage signal corresponding to an electrical current flowing through an electrical path via water molecules adhering to a surface of the first insulating material in response to the voltage applied to the first application section;

wherein the second humidity sensing element comprises:
a second insulation section made of a second insulation material and comprising a second uneven portion;
a second application section to which a voltage with a combined wave including two or more frequency components is applied; and
a second output section which outputs a voltage signal corresponding to an electrical current flowing through a second electrical path via water molecules adhering to a surface of the second insulating material in response to the voltage applied to the second application section;

wherein a first width between the first application electrode as an electrode forming the first application section and the first output electrode as an electrode forming the first output section is set at a value between 20-160 µm, and wherein a total electrode length is less than 90 mm, wherein the total electrode length is a length of an area where a predetermined tooth of the first application electrode and a predetermined tooth of the first output electrode face each other, multiplied by a number of teeth of the first application electrode and the first output electrode; and wherein the first humidity sensing element is of low-temperature type, the second humidity sensing element is of the high-temperature type, and an unevenness of the first uneven portion is smaller than an unevenness of the second uneven portion.

9. The humidity sensing element according to claim 8, wherein
a total sum of lengths of portions where the first application electrode and the first output electrode face each other is set at a value with which the amount of change in the capacitance produced between the first application electrode and the first output electrode with respect to the humidity is equal to or greater than a predetermined value.

* * * * *